United States Patent
Jessup et al.

(10) Patent No.: US 11,938,894 B2
(45) Date of Patent: Mar. 26, 2024

(54) SYSTEM FOR CONTROLLING ONE OR MORE LOCKING WEB RETRACTORS IN A MOTOR VEHICLE OCCUPANT RESTRAINT SYSTEM

(71) Applicant: Indiana Mills & Manufacturing, Inc., Westfield, IN (US)

(72) Inventors: Chris P. Jessup, Sheridan, IN (US); Douglas W. Bittner, Indianapolis, IN (US); Steven Gale, Colfax, IN (US); John Glover, Danville, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 371 days.

(21) Appl. No.: 17/404,086

(22) Filed: Aug. 17, 2021

(65) Prior Publication Data
US 2021/0394707 A1     Dec. 23, 2021

Related U.S. Application Data

(63) Continuation-in-part of application No. 17/002,016, filed on Aug. 25, 2020, now Pat. No. 11,505,160.
(Continued)

(51) Int. Cl.
*B60R 22/343* (2006.01)
*B60R 21/01* (2006.01)
(Continued)

(52) U.S. Cl.
CPC .......... *B60R 22/3416* (2013.01); *B60R 21/01* (2013.01); *B60R 22/343* (2013.01);
(Continued)

(58) Field of Classification Search
CPC .............. B60R 22/3416; B60R 22/343; B60R 2022/4666
See application file for complete search history.

(56) References Cited

U.S. PATENT DOCUMENTS

| | | |
|---|---|---|
| 10,569,737 B2 | 2/2020 | Kleinert et al. |
| 10,688,960 B2 | 6/2020 | Setina et al. |

(Continued)

FOREIGN PATENT DOCUMENTS

DE    102004049882 A1 *   5/2006   ......... B60R 22/3413

OTHER PUBLICATIONS

Biller et al., Belt rewinder for vehicle safety belt system, has brake mechanism with two friction units and electromagnets, where attraction force that is generated by electromagnets is brought in attachment of units, May 18, 2006, EPO< DE 10 2004 049 882 A1, Machine Translation of Descripiton (Year: 2006).*

*Primary Examiner* — James A English
(74) *Attorney, Agent, or Firm* — Barnes & Thornburg LLP

(57) ABSTRACT

A system is provided for controlling operation of an electrically controlled and magnetically actuated locking web retractor of an occupant restraint coupled to an occupant seat of a motor vehicle. A control circuit may monitor output signals produced by one or more sensors configured to produce one or more respective sensor output signals indicative of one or more corresponding sensed conditions of the motor vehicle, vehicle seat or occupant restraint, process the output signals produced by the one or more sensors to determine one or more values of the one or more sensed conditions, compare the one or more determined values of the one or more sensed conditions to one or more corresponding threshold or range values, and then provide a control signal, based on the one or more comparisons, to a magnet actuator of the web retractor to cause the web retractor to lock or unlock.

17 Claims, 13 Drawing Sheets

Related U.S. Application Data

(60) Provisional application No. 62/891,739, filed on Aug. 26, 2019.

(51) Int. Cl.
    *B60R 22/34*     (2006.01)
    *B60R 22/46*     (2006.01)

(52) U.S. Cl.
    CPC ............... *B60R 2021/01272* (2013.01); *B60R 2022/4666* (2013.01); *B60R 2022/4685* (2013.01)

(56) References Cited

U.S. PATENT DOCUMENTS

| | | | |
|---|---|---|---|
| 2009/0069983 A1* | 3/2009 | Humbert | B60R 22/40 280/806 |
| 2019/0106082 A1* | 4/2019 | Kleinert | B60R 22/3416 |
| 2020/0331430 A1 | 10/2020 | Setina et al. | |

* cited by examiner

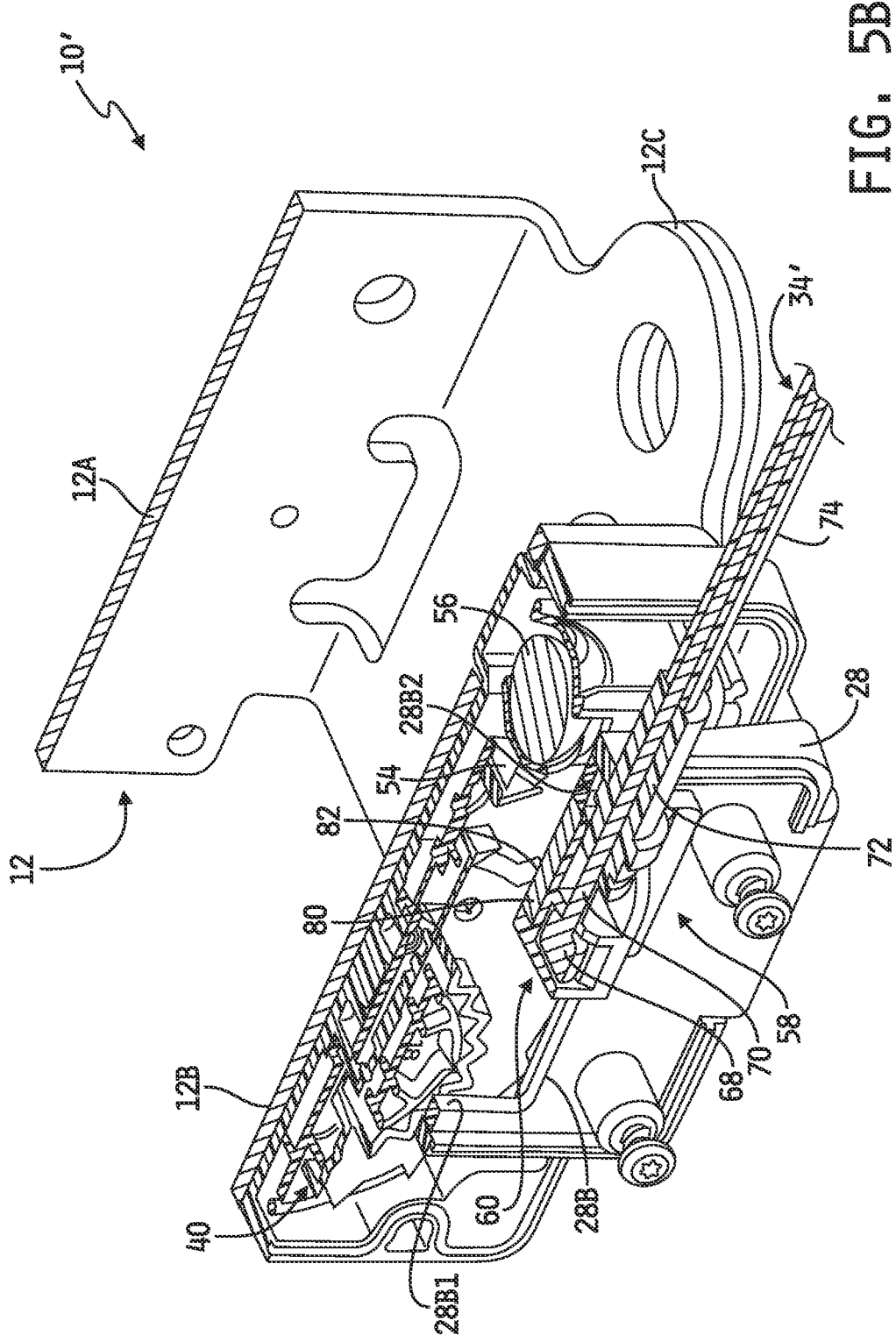

SYSTEM FOR CONTROLLING ONE OR MORE LOCKING WEB RETRACTORS IN A MOTOR VEHICLE OCCUPANT RESTRAINT SYSTEM

CROSS-REFERENCE TO RELATED APPLICATIONS

This is a continuation-in-part (CIP) of U.S. patent application Ser. No. 17/002,016, filed Aug. 25, 2020, which claims the benefit of and priority to U.S. Provisional Patent Application Ser. No. 62/891,739, filed Aug. 26, 2019, the disclosures of which are expressly incorporated herein by reference in their entireties.

TECHNICAL FIELD

The present disclosure relates generally to restraint systems for occupant seats mounted in motor vehicles, and more specifically to systems for electronically controlling operation of one or more locking web retractors included in such restraint systems.

BACKGROUND

Restraint systems for motor occupant seats for motor vehicles are known and may include one or more locking web retractors, some examples of which include automatic locking retractors (ALRs) and emergency locking retractors (ELRs). Some such retractors may include mechanical locking mechanisms which lock under various operating conditions of the motor vehicle to prevent payout of a web attached thereto in a web pay out direction.

SUMMARY

The present disclosure may comprise one or more of the features recited in the attached claims, and/or one or more of the following features and combinations thereof. In one aspect, a system is provided for controlling operation of an electrically controlled and magnetically actuated locking web retractor of an occupant restraint operatively coupled to an occupant seat of a motor vehicle. The system may comprise one or more sensors or sensing systems operatively mounted to at least one of the occupant restraint, the occupant seat and the motor vehicle, and configured to produce one or more respective sensor output signals indicative of one or more corresponding sensed conditions, a control circuit, and a memory unit having stored therein instructions executable by the control circuit to (i) process the one or more sensor output signals to determine one or more values of the one or more sensed conditions, (ii) compare the one or more determined values of the one or more sensed conditions to one or more corresponding threshold or range values, (iii) produce a control signal, based on the one or more comparisons, for locking or unlocking of the web retractor, and (iv) provide the control signal to a magnet actuator the web retractor to cause the web retractor to lock or unlock.

In another aspect, a method is provided for controlling operation of an electrically controlled and magnetically actuated locking web retractor of an occupant restraint operatively coupled to an occupant seat of a motor vehicle. The method may comprise monitoring, by a control circuit, output signals produced by one or more sensors or sensing systems operatively mounted to at least one of the occupant restraint, the occupant seat and the motor vehicle and configured to produce one or more respective sensor output signals indicative of one or more corresponding sensed conditions, processing, by the control circuit, the output signals produced by the one or more sensors or sensing systems to determine one or more values of the one or more sensed conditions, comparing, by the control circuit, the one or more determined values of the one or more sensed conditions to one or more corresponding threshold or range values, and providing, by the control circuit, a control signal, based on the one or more comparisons, to a magnet actuator of the web retractor to cause the web retractor to lock or unlock.

In yet another aspect, a system is provided for controlling operation of an electrically controlled and magnetically actuated locking web retractor of an occupant restraint operatively coupled to an occupant seat of a motor vehicle. The system may comprise at least one sensor configured to produce at least one sensor output signal corresponding to at least one corresponding operating condition of the motor vehicle, a control circuit, and a memory unit having stored therein instructions executable by the control circuit to (i) process the at least one sensor output signal to determine at least one value of the at least one operating condition, (ii) compare the at least one determined value of the at least one operating condition to one or more corresponding threshold or range values, (iii) determine a control signal, based on the one or more comparisons, for locking or unlocking of the web retractor, and (iv) provide the control signal to a magnet actuator the web retractor to cause the web retractor to lock or unlock.

BRIEF DESCRIPTION OF THE DRAWINGS

FIG. 5B is a cross-sectional view of the locking web retractor of FIG. 5A as viewed along section lines 5B-5B thereof.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

Figure 1:
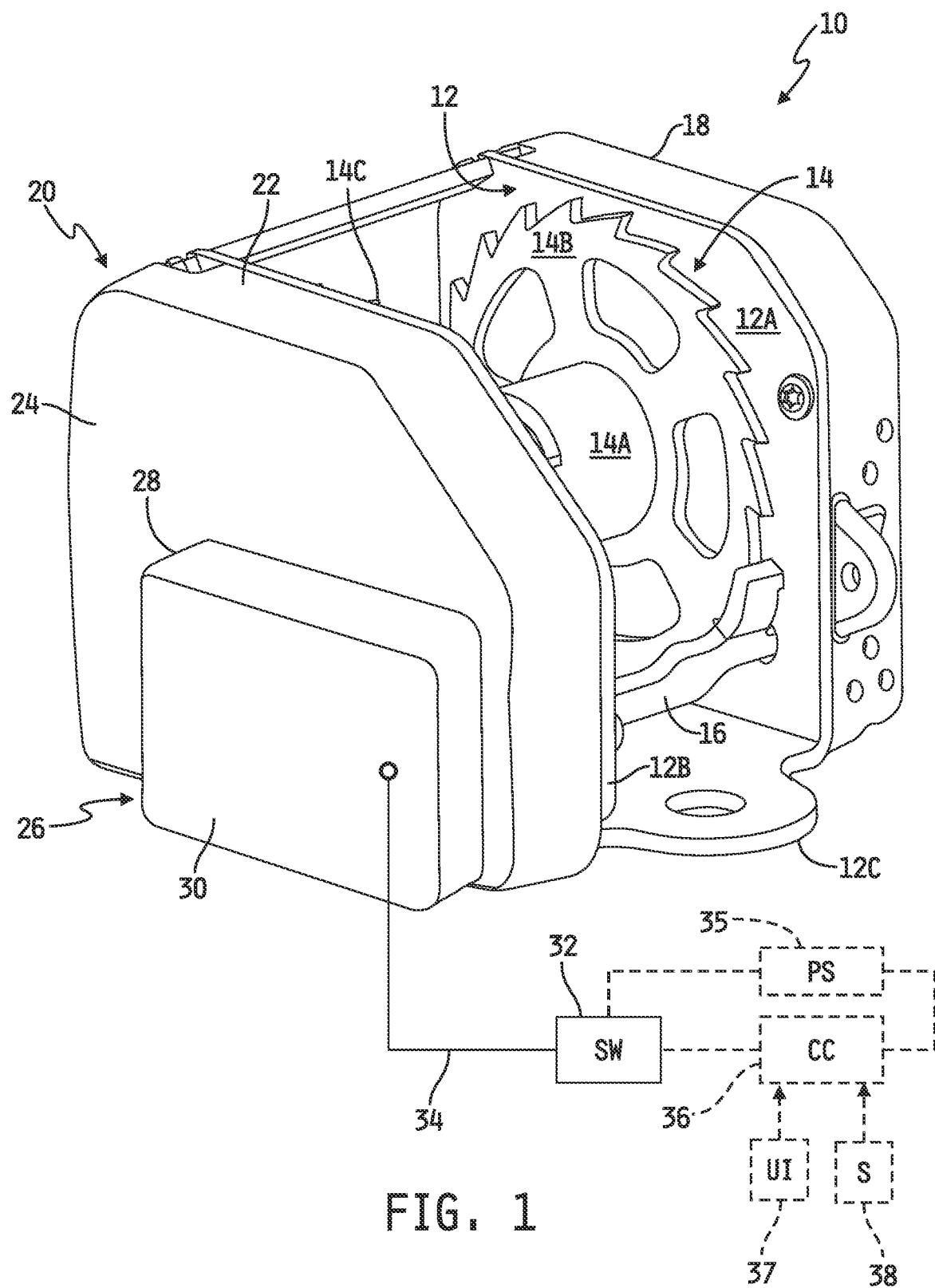
FIG. 1 is a perspective view of an embodiment of a locking web retractor with a controllable locking apparatus.

This disclosure relates to devices and techniques for controllably locking and unlocking a locking web retractor. Referring now to FIG. 1, an embodiment is shown of a locking web retractor 10 including a lock actuating module 26 for selectively actuating locking components 40 (see, e.g., FIGS. 2A and 2B) carried within a locking module 20 to lock a spool 14 of the web retractor 10 to prevent the spool 14 from rotating in a web payout direction, i.e., in a direction which pays out web wrapped around the spool 14, and to unlock the spool 14 to allow the spool 14 to rotate in the web payout direction to pay out web from the retractor 10. In the illustrated embodiment, the web retractor 10 includes a frame 12 having a pair of spaced-apart sidewalls 12A and 12B each extending away from a base 12C of the frame 12. Illustratively, the sidewalls 12A and 12B are substantially parallel with one another. In any case, a space is defined between the sidewalls 12A and 12B and a spool 14 is rotatably mounted within the space to and between the sidewalls 12A and 12B in a conventional manner such that the spool 14 is rotatable relative to the sidewalls 12A, 12B. The spool 14 illustratively includes a spindle 14A having toothed wheels 14B, 14C each mounted to a respective end of the spindle 14A. A spool shaft 14D is rigidly mounted to the spool 14 such that the shaft 14D rotates with the spindle 14A. The spool shaft 14D illustratively extends through the sidewall 12B of the frame 12 and outwardly away from the sidewall 12B into the locking module 20 (see, e.g. FIGS. 2A and 2B).

One end of a conventional flexible web (not shown) will typically be attached to the spool 14, and the web will then be wrapped around the spindle 14A in a conventional manner. A free end (not shown) of the web will generally extend from the retractor 10, and an engagement member (not shown), e.g., a hook, tongue assembly, buckle assembly or other conventional engagement member, may be attached to the free end of the web. A conventional power spring assembly 18, e.g., a power spring contained within a housing or cover, is operatively coupled to the spool 14 and to the sidewall 12A of the frame 12. The power spring assembly is configured in a conventional manner to apply, via the power spring, a rotational biasing force to the spool 14 in a web take up direction, i.e., in a direction which takes up web onto the spool 14. This rotational biasing force may illustratively be overcome, when the retractor 10 is not locked by the locking components 40 from rotating the spool 14 in the opposite, web payout direction (as will be described below), by pulling on the free end of the web with a force greater than the biasing force of the power spring to cause the spool 14 to rotate in the web payout direction so as to pay out web from the spool 14. The locking module 20 is illustratively mounted to the opposite sidewall 12B.

In the illustrated embodiment, the web retractor 10 further includes a conventional lock pawl 16 movably mounted to and between the sidewalls 12A, 12B of the frame 12. In embodiments which include it, the lock pawl 16 movable relative to the sidewalls 12A, 12B between a locked position in which the lock pawl 16 engages the toothed wheels 14A, 14B, e.g., between adjacent teeth thereof, to thereby prevent rotation of the spool 14 in the web payout direction, and an unlocked position in which the lock pawl 16 is moved away from and does not engage the toothed wheels 14A, 14B, to thereby allow the spool 14 to rotate in the web payout direction. In the embodiment illustrated in FIG. 1, one end of the lock pawl 16 extends into the locking module 20 and the locking components 40 carried within the locking module 20 engage and act on this end of the lock pawl 16 to control the lock pawl 16 between its locked and unlocked positions as will be described below to thereby prevent or allow rotation of the spool 14 in the web pay out direction. Also in the illustrated embodiment, the locking components 40 carried within the locking module 20 illustratively may further act on the spool shaft 14D extending into the module 20 to independently prevent or allow rotation of the spool 14 in the web payout direction. In this regard, the lock pawl 16 may be omitted in some alternate embodiments, and the locking components 40 carried within the locking module 20 may act solely on the spool shaft 14D to prevent or allow rotation of the spool 14 in the web payout direction. In other alternate embodiments, the lock pawl 16 may be included, and the locking components 40 and the lock pawl 16 may together act to prevent or allow rotation of the spool 14 in the web payout direction.

In the example embodiment illustrated in FIG. 1, the locking retractor 10 is illustratively provided in the form of a sealed retractor wherein the locking module 20 includes a housing 22 in which the locking components 40 are disposed, a cover 24 is affixed to an open end of the housing 22 to seal the locking components therein, a back side of the housing 22 is coupled an outer surface of the sidewall 12B of the frame 12 and seals are provided between the housing 22 and components of the retractor 10 extending therein, e.g., between the shaft 14D and the housing 22 as well as between one end of the lock pawl 16 and the housing 22. Such sealing of the locking module 20 blocks ingress of moisture and particles to the locking components 40 such that the locking components 40 are maintained functional during exposure of the retractor 10 to harsh environments such as, for example, dust, dirt and mud, and including full or partial immersion of the retractor 10 in water that may include various amounts of dirt or mud, e.g., ponds, lakes, streams, ditches, puddles, etc. Further details relating to various embodiments of such a sealed retractor are set forth in U.S. Pat. Nos. 9,902,366, 9,381,888, 9,266,497 and 9,150,190, all of which are assigned to the assignee of this disclosure and the disclosures of which are all incorporated herein by reference in their entireties. In alternate embodiments, the housing 22 may illustratively be omitted, the locking components 40 may be mounted directly to the outer surface of the sidewall 12B of the frame 12, and the cover 24 may be positioned over the locking components 40 and affixed to the outer surface of the sidewall 12B of the frame 12 to seal the locking components 40 between the sidewall 12B and the cover 24. Those skilled in the art will recognize, however, that the locking actuator concepts illustrated and described herein are not limited to sealed retractors, and may alternatively or additionally be implemented in any locking retractor which includes at least one movable component for preventing and allowing rotation of a web spool in the web payout direction, wherein the at least one movable component is made of or includes metal that is ferromagnetic or the at least one movable component can be implemented using material that is made of or includes ferromagnetic material, i.e., attracted by a magnetic field. It will be understood that implementation of the locking actuator concepts illustrated and described herein in any such locking retractor may be applied directly to such movable component(s) in order to selectively prevent and allow rotation of a web spool in the web payout direction, and that any such implementation is intended to fall within the scope of this disclosure.

In some embodiments, the locking module 20 illustratively includes one or more locking components 40 that lock rotation of the spool 14 under one or more "emergency conditions" such that the resulting locking retractor 10 is, in such embodiments, a so-called conventional emergency locking retractor or ELR. In other embodiments, the locking module 20 illustratively includes one or more locking components 40 that automatically lock rotation of the spool 14 under one or more non-emergency conditions such that the resulting locking retractor 10 is, in such embodiments, a so-called automatic locking retractor or ALR. In still other embodiments, the locking module 20 illustratively includes one or more locking components 40 that automatically lock rotation of the spool 14 under one or more non-emergency conditions and that lock rotation of the spool 14 under one or more emergency conditions such that the resulting locking retractor 10 is, in such embodiments, a combination ALR and ELR.

In the embodiment illustrated in FIG. 1, the lock actuating module 26 includes a housing 28 in which one or more actuating components 58 are disposed (for selectively causing the locking components 40 to prevent rotation of the spool 14 in the web pay out direction, wherein a back side of the housing 28 is affixed, e.g., via conventional fixation members, adhesive, or the like, to at least a portion of the outer surface of the cover 24 of the housing 22 of the lock module 20. In alternate embodiments, the housing 28 may be integral with the cover 24 such that the cover 24 and the housing 28 are of unitary construction. In any case, a cover 30 is affixed to an open end of the housing 28 over the one or more actuating components 58. In some embodiments, the cover 30 may be sealed to the open end of the housing 18 so as to seal the one or more actuating components 58 therein. In any case, the one or more actuating components 58 is/are illustratively selectively operable to actuate one or more of the locking components 40 housed within the lock module 20 to selectively lock and unlock the web retractor 10. It will be understood that the term "lock," when used herein with respect to the web retractor 10, means that the locking components 40 are made or induced to act in a manner that prevents the spool 14 from rotating in the web payout direction, e.g., by acting upon either or both of the spool shaft 14D and the lock pawl 16 as described above, while, in some embodiments, allowing the spool 14 to rotate in the web take up direction, and the term "unlock" means that the locking components 40 are made or induced to act in a manner that allows the spool 14 to rotate in the web payout direction, e.g., by applying a force to the web in the payout direction that is greater than the biasing force of the power spring contained in the power spring assembly 18, by, e.g., acting upon either or both of the spool shaft 14D and the lock pawl 16 as described above, while also allowing the spool 14 to rotate in the web take up direction. In some embodiments, the housings 22, 28 and the covers 24, 30 are formed by a moldable synthetic or semi-synthetic organic solid material such as a polymer or similar material, although this disclosure contemplates that the housings 22, 28 and the covers 24, 30 may be alternatively formed of one or more additional or other materials.

The one or more actuating components 58 is/are operatively coupled to a switch 32 via a locking actuator interface 34. In some embodiments, the switch 32 is a mechanical switch that is movable manually from one position to another, and the locking actuator interface 34 is a mechanical linkage configured to move one or more of the actuating components 58 from one position to another in response to the switch 32 being actuated, e.g., moved from one position to another. In some such embodiments, the mechanical switch may include a lever or handle sized and configured to facilitate manual actuation thereof.

In other embodiments, the switch 32 may be a mechanical, electromechanical or electronic switch coupled to a source of electrical energy 35 as shown in FIG. 1 by dashed-line representation, e.g., an electrical power source, PS, in the form of a voltage and/or current source, and the locking actuator interface 34 may be an electrical interface electrically connecting the switch 32 to the one or more actuating components 58. In this embodiment, the one or more actuating components 58 is/are activated electrically by controlling the switch 32 to an active or "on" position to supply electrical power from the power source 35 to the one or more actuating components 58 and deactivated electrically by controlling the switch 32 to an inactive or "off" position. In some such embodiments, the switch 32 may be a manual switch that is manually movable between the on and off positions. In some embodiments, the switch 32 may be or include an electromechanical switch, such as a solenoid or other conventional electromechanical switch.

Alternatively or additionally, the switch 32 may be electrically connected to, or be included as part of, a control circuit 36 as also shown in FIG. 1 by dashed-line representation. In some such embodiments, the control circuit 36 may be electrically connected to the power source 35, or the control circuit 36 may instead be coupled to a different source of electrical power. In any case, the control circuit 36, in embodiments which include it, may be controlled to activate/deactivate the one or more actuating components 58 in response to a manual input, e.g., an input initiated by a person, and/or the control circuit 36 may be programmed to control activation/deactivation of the one or more actuating components 58 automatically, i.e., in response to a manual and/or electrically controlled or generated signal. In the latter case, the control circuit 36 may include a conventional processor and a conventional memory circuit having instructions stored therein that are executable by the processor to control activation/deactivation of the one or more actuating components in accordance therewith. In some such embodiments, such instructions may act on input(s) provided by a user interface 37 as shown in FIG. 1 by dashed-line representation. Alternatively or additionally, such instructions may act on input(s) provided by one or more sensors or sensing systems 38 as also shown in FIG. 1 by dashed-line representation. An example of such one or more sensors or sensing systems 38 may include, but is not limited to, a weight or pressure sensor configured to produce at least one signal indicative of the weight or weight range of a person seated in a motor vehicle seat having a restraint system of which the web retractor 10 is a part. Other examples will occur to those skilled in the art, and it will be understood that any such other sensors or sensing systems are intended to fall within the scope of this disclosure.

Figure 2A:
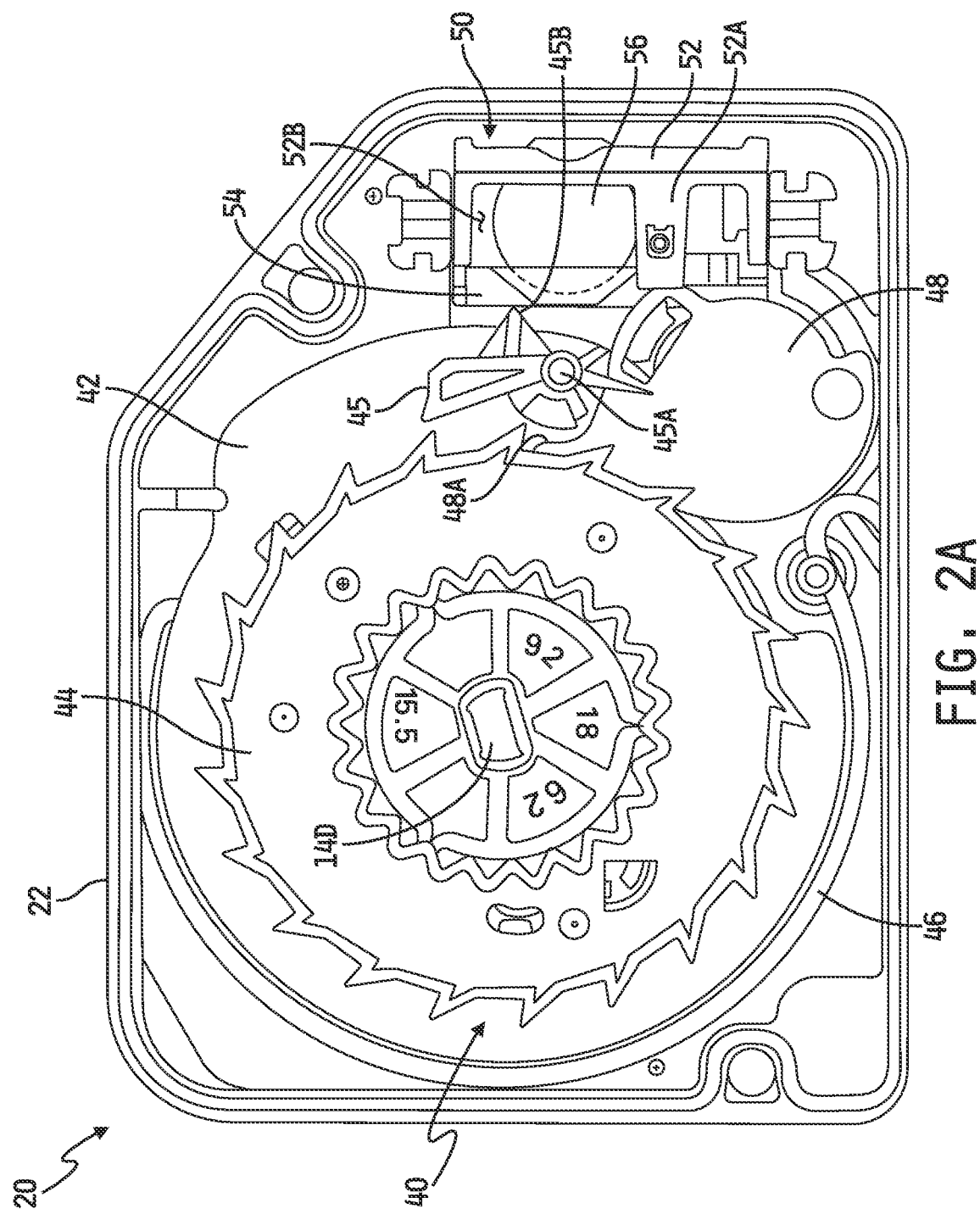
FIG. 2A is a front elevational view of an embodiment of locking components carried in the locking component housing illustrated in FIG. 1 with the locking components shown in an unlocked state.
Figure 2B:
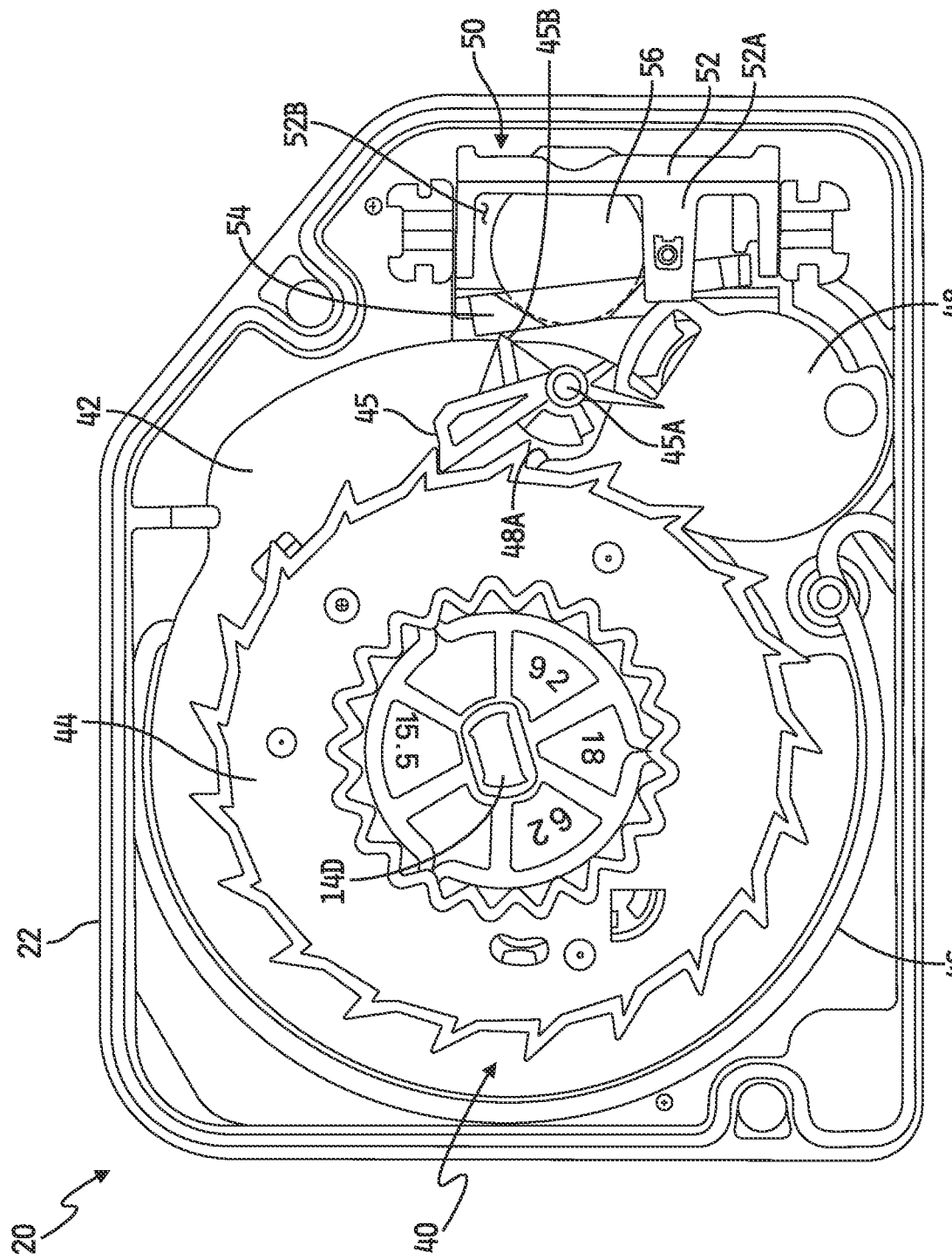
FIG. 2B is a front elevational view similar to FIG. 2A but with the locking components shown in a locked state.
Figure 3:
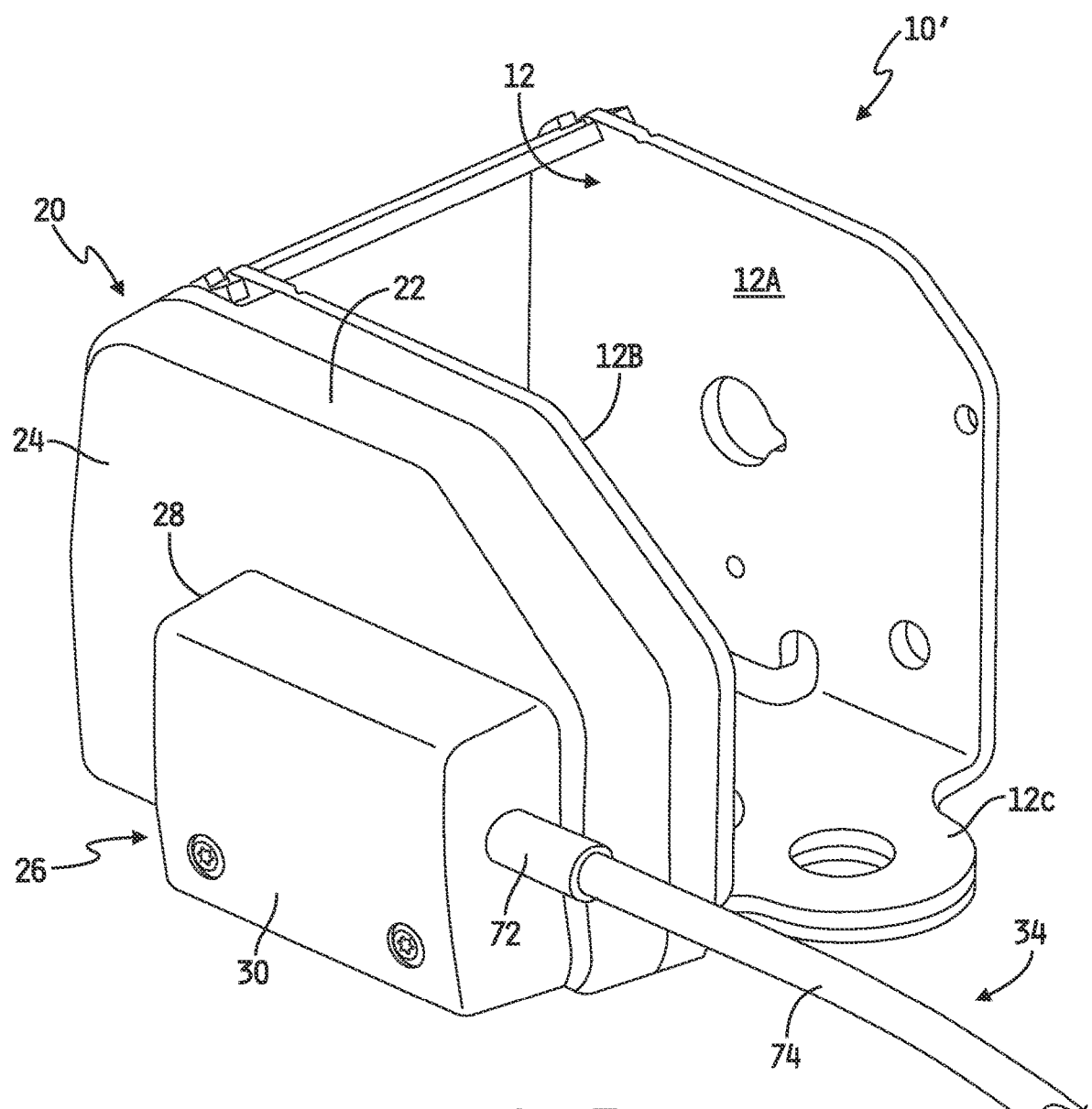
FIG. 3 is a perspective view of an example embodiment of the locking web retractor of FIGS. 1-2B including a mechanically controllable locking apparatus.

Referring now to FIGS. 2A and 2B, an embodiment of the locking components 40 carried within the housing 22 is shown, wherein the locking components 40 illustrated in FIG. 2A are in an unlocked state corresponding to the unlocked state of the web retractor 10 and the locking components 40 illustrated in FIG. 2B are in a locked state corresponding to the locked state of the web retractor 10. In the illustrated embodiment, the locking components 40 illustratively include a locking plate 42 through which the spool shaft 14D centrally passes, a toothed clutch plate 44 operatively mounted to the locking plate 42 and defining a slot centrally therethrough sized and configured to receive the spool shaft 14D therein such that the clutch plate 44 rotates with the spool shaft 14D relative to the locking plate 42 which generally remains stationary when the retractor 10 is unlocked. One end of a biasing member 46, e.g., a spring in the form of a single wire, is coupled to an underside of the locking plate 42. The body of the wire 46 is fitted into a channel formed in the underside of the locking plate 46, and the hooked opposite end of the biasing member 46 engages, e.g., is looped about, a protrusion extending from the housing 22. An underside of a lock pawl engagement member 48 defines a slot that is sized and configured to receive therein the end of the lock pawl 16 that extends into the housing 22 in embodiments which include the lock pawl 16. The lock pawl engagement member 48 also defines a lobe 48A configured to engage a post defined on the locking plate 42 such that movement of the post causes the locking bar engagement member 48 to rotate relative to the housing 22 and thereby move the lock pawl 16 into and out of its locked and unlocked positions. In embodiments which do not include the lock pawl 16, the lock pawl engagement member 48 may be omitted. Another lock pawl 45 is rotatably mounted to a top surface of the locking plate 42, and is pivotable about a mounting post 45A relative to the locking plate 42. The lock pawl 45 is normally biased away from the toothed clutch plate 44, as illustrated by example in FIG. 2A A locking actuator 50 is disposed within the housing 22 and includes a frame 52 positioned within the housing 22 so as to remain stationary therein. A lower wall 52A of the frame 52 is pivotally coupled to an actuating arm 54. The actuating arm 54 is pivotable about the free end of the lower wall 52A toward and away from a space 52B defined between the actuating arm 54 and an opposite wall of the frame 52, and also toward and away from an actuating lobe or ear 45B extending away from the lock pawl 45. The space 52B is sized to receive a ball 56 therein, wherein the ball 56 is illustratively configured to actuate the lock pawl 45 under certain inertial conditions. In the illustrated embodiment of the web retractor 10, the ball 56 is illustratively formed of 400 series steel and is therefore ferromagnetic. In alternate embodiments, the ball 56 may be formed of any one or more conventional materials so long as the resulting ball 56 is sufficiently ferromagnetic to operate in response to a magnetic field applied thereto as described below with respect to FIGS. 4A-5B.

During non-locking conditions of the retractor 10 as illustrated in FIG. 2A, the lock pawl 45 is biased away from the teeth of the clutch plate 44 as described above, and in the biased state of the lock pawl 45 the lobe or ear 45B extending away from the lock pawl 45 engages the actuating arm 54 of the frame 52 so as to maintain the actuating arm pivoted toward the space 52B as described above. In its normal, biased position, the lock pawl 45, via the lobe or ear 45B, biases the actuating arm 54 toward the opposite wall of the frame 52 of the locking actuator 50. During such non-locking conditions with the lock pawl 45 biased away from the teeth of the clutch plate 44, the clutch plate 44 rotates with the shaft 14D of the spool 14. Under such conditions, the biasing member 46 positions the post defined on the locking plate 42 to act on the lobe 48A of the locking bar engagement member 48 in a manner which causes the locking bar engagement member 48 to position the lock pawl 16 away from the teeth of the gears or wheels 14A, 14B of the spool 14 so that the spool 14 may rotate in the web payout direction such that web may be paid out therefrom, and may also rotate in the web take up direction such that the web may be taken up on the spool 14.

During certain locking conditions of the retractor 10, e.g., gravity-based and inertial-based locking conditions, the ball 56 moves, in response thereto, against and forces the actuating arm 54 of the locking actuator 50 against the lobe or ear 45B of the lock pawl 45 which, in turn, forces the lock pawl 45 into contact with the clutch plate 44 as illustrated in FIG. 2B. Rotation of the spool shaft 14D in the web payout direction under such conditions brings one of the teeth of the clutch plate 44 into contact with the lock pawl 45, thereby blocking and preventing further rotation of the clutch plate 44 and locking the clutch plate 44 to the locking plate 42. Further rotation of the spool shaft 14D in the web payout direction applies a rotational force to the combination of the clutch plate 44 and the locking plate 42 in the counterclockwise direction against the biasing member 46. When this rotational force is greater than the biasing force of the biasing member 46, the resulting rotational movement of the combination of the clutch plate 44 and the locking plate 42 in the counterclockwise direction causes the post on the underside of the locking plate 42 to act against and rotate the lobe or arm 48A of the locking bar engagement member 48 in the counterclockwise direction. This movement of the locking bar engagement member 48, in turn, rotates the lock pawl 16 into engagement with the toothed wheels 14A, 14B of the spool 14 to thereby prevent the spool 14 from rotating in the web payout direction. In alternate embodiments of the retractor 10 that do not include the lock pawl 16, the locking bar engagement member 48 may be omitted and the locking plate 42 may be rigidly affixed to the housing 22 such that movement of the ball 56 forces the actuating arm 54 of the locking actuator 50 against the lock pawl 45 which solely prevents the spool 14 from rotating in the web payout direction during locking conditions of the web retractor 10. In other alternate embodiments of the retractor 10 in which the lock pawl 16 alone is to prevent the spool 14 from rotating in the web payout direction during locking conditions of the web retractor 10, the locking components 40 may be modified such that the actuating arm 52B of the locking actuator 50 acts directly or indirectly against the locking bar engagement member 48 to move the locking bar engagement member 48 in a manner that rotates the lock pawl 16 into engagement with the toothed wheels 14A, 14B of the spool 14 to thereby prevent the spool 14 from rotating in the web payout direction.

In any case, when non-locking conditions return, e.g., the gravity or inertial-based event has subsided, the biased lock pawl 45 forces the actuating arm 54 against the ball 56 and back toward the space 52B which draws the lock pawl 45 away from the teeth of the clutch plate 44 to allow the clutch plate 44 to again rotate with the shaft 14D of the spool 14 as described above. This, in turn, allows the biasing member 46 to return the locking plate 42 to return to a non-locking position in which the post on the bottom side of the locking plate 42 acts against and rotates the lobe or arm 48A of the locking bar engagement member 48 back in the clockwise direction which, in turn, rotates the lock pawl 16 away from the toothed wheels 14A, 14B of the spool 14 to thereby again allow the spool 14 to rotate in the web payout and take-up directions.

Referring now to FIGS. 3-5B, an example embodiment 10' is shown of the web retractor 10 illustrated in FIG. 1 in which the switch 32 is a mechanical switch that is manually movable from one position to another, and the locking actuator interface 34 is a mechanical linkage illustratively provided in the form of a conventional mechanical control cable 34' configured to move one or more of the actuating components 58 from one position to another in response to the switch 32 being moved from one position to another. In the illustrated embodiment, the actuating components 58 mounted in the housing 28 of the lock actuating module 26 include a sliding magnet carrier 60 slidably mounted to the bottom wall 28A of the housing 28. The bottom wall 28A of the housing 28 illustratively defines an opening 28B therethrough, and the carrier 60 defines a central body 62 sized to be received in and project at least partially through the opening 28B as best illustrated in FIG. 4A. The central body 62 is flanked by upper and lower wings 64A, 64B configured to ride along the bottom wall 28A of the housing 28 on the top and bottom respectively of the opening 28B as the carrier 60 slides fore and aft within the housing 28 relative to the opening 28B. The exposed surface of the central body 62 projecting into the opening 28B defines a pocket or channel 62A sized to receive a permanent magnet 80 therein. A magnetized face 82 of the permanent magnet 80 faces the outer surface of the cover 24 of the lock module 20. In some embodiments, the opening 28B is open to the compartment defined between the housing 22 and the cover 24, i.e., the compartment in which the locking components 40 reside, although in other embodiments the compartment defined between the housing 22 and the cover 24 remains sealed and the opening 28B faces the outer surface of the cover 24. In any case, the housing 28 is illustratively positioned relative to the housing 22, more specifically, relative to the components contained within the housing 22, so as to position the permanent magnet 80 in operative relationship relative to the ferromagnetic ball 56 as described in detail below.

An opposite surface of the carrier 60, i.e., opposite the central body 62, illustratively defines another pocket 66 sized to receive and retain therein a head 68 of an inner cable 70 of the mechanical control cable 34'. An end fitting 72 of the control cable 34' is secured to the housing 28 and a stationary sheath 74 is coupled to the end fitting 72. Via control of the mechanical switch 32, e.g., in the form of a mechanical lever or the like, the position of the head 68 of the inner cable 70 relative to the end fitting 72 and sheath 74 may be varied relative to the housing 28 in a conventional manner to control the position of the sliding magnet carrier 60, and thus the position of the permanent magnet 80, relative to the opening 28B defined through the bottom surface of the housing 28, and thus relative to the position of the ferromagnetic ball 56 positioned within the housing 22 as described above with respect to FIGS. 2A and 2B.

Figure 4A:
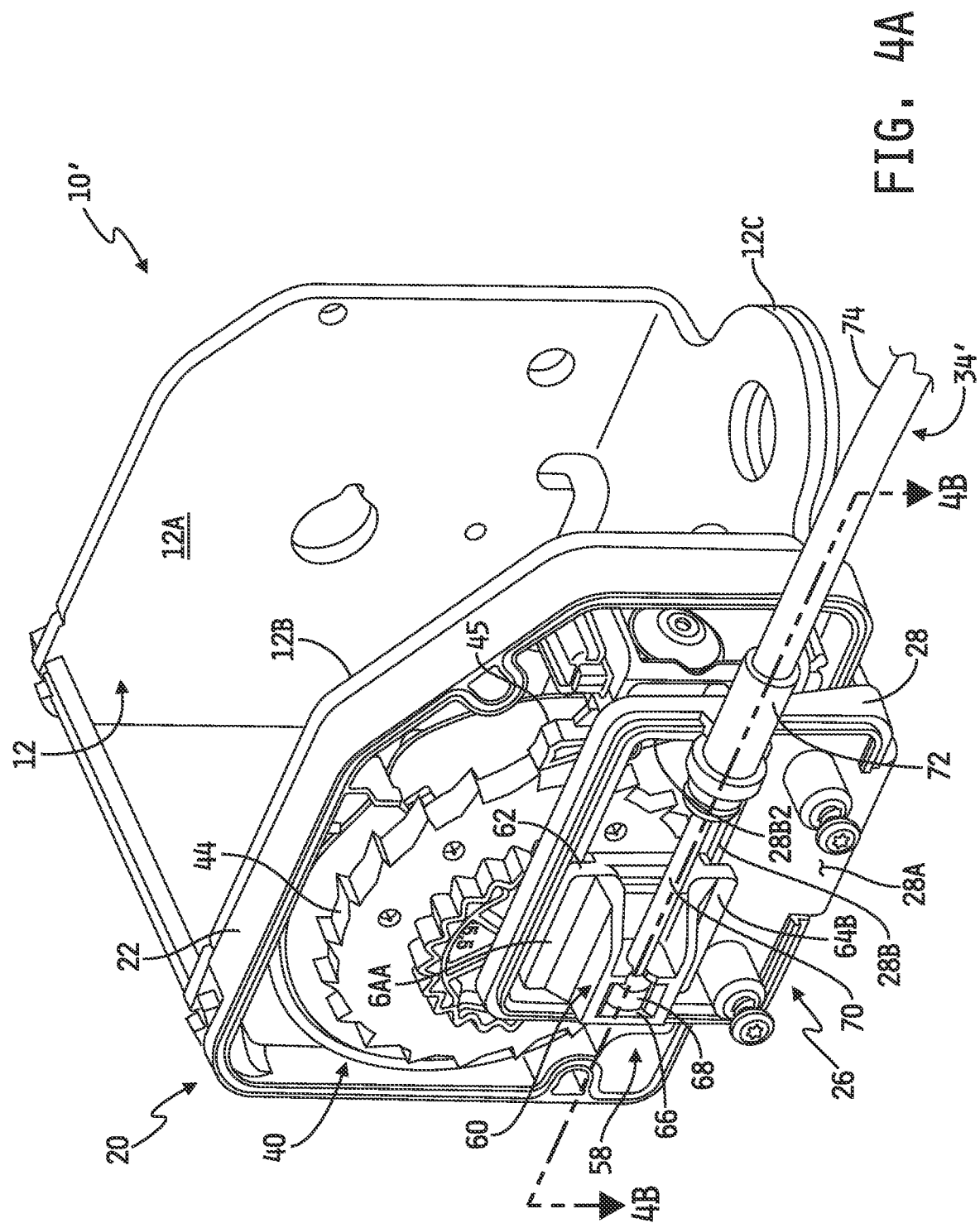
FIG. 4A is a perspective view similar to FIG. 3 but with the housing covers removed and showing the mechanically controllable locking apparatus in an unlocked position or state.
Figure 4B:
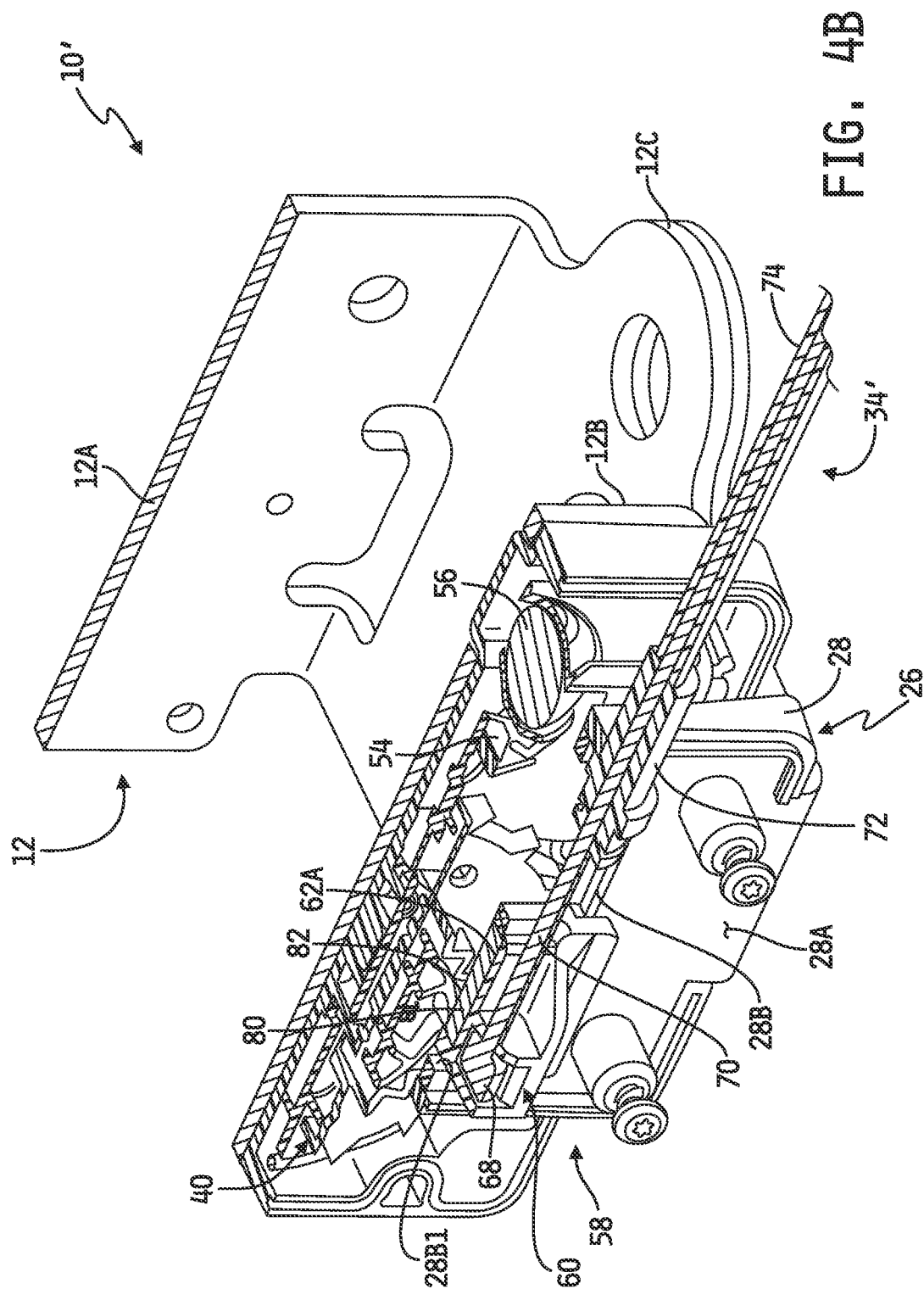
FIG. 4B is a cross-sectional view of the locking web retractor of FIG. 4A as viewed along section lines 4B-4B thereof.

In the illustrated embodiment, the switch 32 (see FIG. 1) is movable to an unlocking position in which the head 68 of the inner cable 70 extends outwardly away from the fitting 72 and the sheath 74 to cause the sliding magnet carrier 60 to slide along the opening 28B to position the sliding magnet carrier 60 at or adjacent to a distal wall 28B1 of the opening 28B as illustrated by example in FIG. 4A. In this position, the face 82 of the permanent magnet 80 is sufficiently remote from the ferromagnetic ball 56 that the magnetic force of the magnetic field produced by the permanent magnet 80 the ball 56 is too weak to draw the ball 56 into the actuating arm 54 sufficiently to cause the actuating arm 54 to move the lock pawl 45 into engagement with the clutch plate 44, as illustrated by example in FIGS. 4A and 4B. Consequently, the web retractor 10' remains in its unlocked condition or state in which the lock pawl 45 is biased away from the teeth of the clutch plate 44 and the biased pawl 45, in turn, biases the actuating arm 54 toward the opposite wall of the frame 52 of the locking actuator 50, as illustrated by example in FIG. 2A. During such non-locking conditions, the spool 14 may rotate in the web payout direction such that web may be paid out therefrom, and may also rotate in the web take up direction such that the web may be taken up on the spool 14.

Figure 5A:
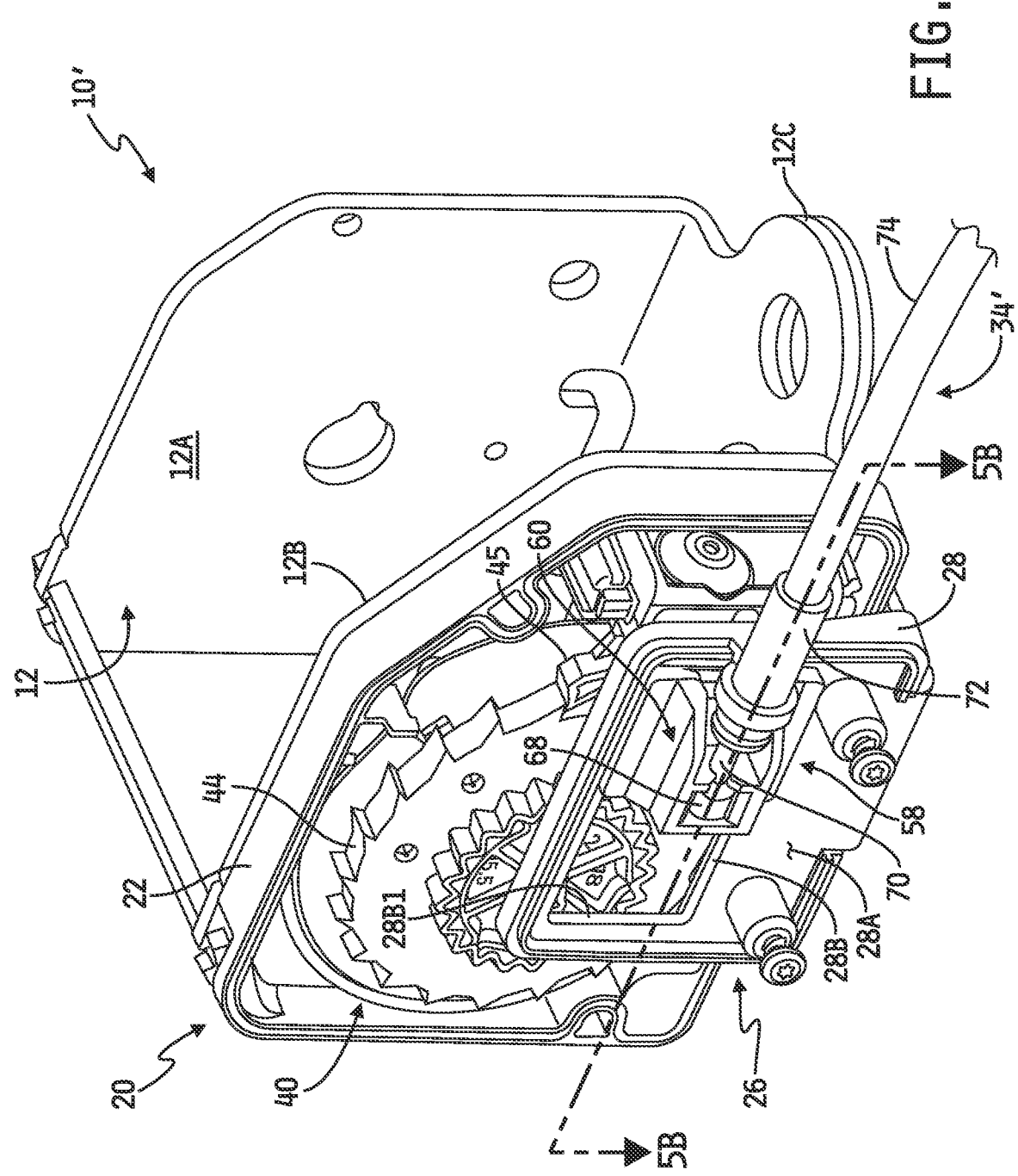
FIG. 5A is a perspective view similar to FIG. 4A but showing the mechanically controllable locking apparatus moved to a locked position or state.

The switch 32 (see FIG. 1) is further movable to a locking position in which the head 68 of the inner cable 70 is drawn towards the fitting 72 and into the sheath 74 to cause the sliding magnet carrier 60 slide along the opening 28B to position the sliding magnet carrier 60 at or adjacent to a proximal wall 28B2 of the opening 28B as illustrated by example in FIG. 5A. In this position, the face 82 of the permanent magnet 80 is sufficiently close to the ferromagnetic ball 56 that the force of the magnetic field produced by the magnet 80 draws the ball 56 into the actuating arm 54 sufficiently to cause the actuating arm 54 to move the lock pawl 45 into engagement with the clutch plate 44, as illustrated by example in FIGS. 5A and 5B. Consequently, the web retractor 10' is moved thereby to the locked condition or state in which rotation of the spool shaft 14D in the web payout direction brings one of the teeth of the clutch plate 44 into contact with the lock pawl 45, thereby blocking and preventing further rotation of the clutch plate 44 and locking the clutch plate 44 to the locking plate 42, and wherein further rotation of the spool shaft 14D in the web payout direction applies a rotational force to the combination of the clutch plate 44 and the locking plate 42 in the counterclockwise direction against the biasing member 46 which, when greater than the biasing force of the biasing member 46, causes the locking plate 42 to rotate the lobe or arm 48A of the locking bar engagement member 48 which, in turn, rotates the lock pawl 16 into engagement with the toothed wheels 14A, 14B of the spool 14 to thereby prevent the spool 14 from rotating in the web payout direction.

Figure 6:
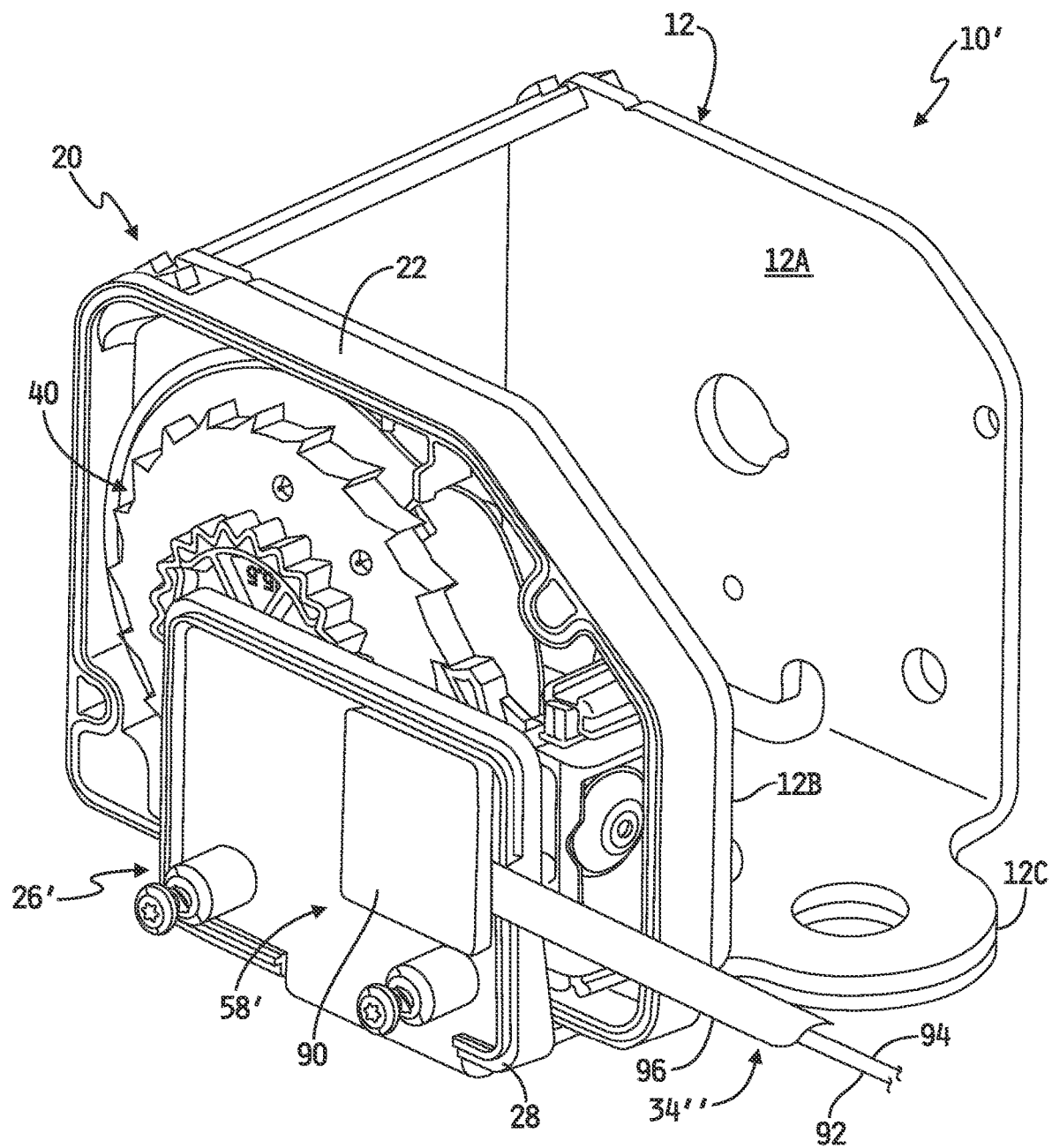
FIG. 6 is a perspective view of another example embodiment of the locking web retractor of FIGS. 1-2B having an electrically controllable locking apparatus.

Referring now to FIG. 6, another example embodiment 10" is shown of the web retractor 10 illustrated in FIG. 1 in which the switch 32 may be a mechanical or electronic switch (e.g., a stand-alone electronic switch or included as part of the control circuit 36 in embodiments which include it) coupled to an electrical power source 35, and the locking actuator interface 34 may be an electrical interface 34" electrically connecting the switch 32 to the one or more actuating components 58. In this embodiment, the one or more actuating components 58' housed within the lock actuating module 26' is provided in the form of at least one conventional electromagnet 90, i.e., a magnet structure which generates a magnetic field only when electrical power is applied thereto and which does not generate a magnetic field when the electrical power is removed or withdrawn. The electromagnet 90 is illustratively fixed in approximately the same position as the permanent magnet 80 in the locked position of the web retractor 10' (see FIGS. 5A and 5B). The electrical interface 34" illustratively includes at least one electrical conductor electrically connected between the electromagnet 90 and the switch 32. In the illustrated embodiment, the at least one electrical conductor includes two electrical conductors 92, 94, e.g., electrically conductive wires, insulated from one another within an electrically insulating sheath 96.

The electromagnet 90 is electrically activated (to generate a magnetic field) by controlling the switch 32 to an active or "on" position to supply electrical power from the power source 35 to the electromagnet 90, and is electrically deactivated (to cease generating the magnetic field) by controlling the switch 32 to an inactive or "off" position. In some such embodiments, the switch 32 may be a manual switch that is manually movable between the on and off positions. When electrically activated, the magnetic field generated by the electromagnet 90 draws the ferromagnetic ball 56 into the actuating arm 54 sufficiently to cause the actuating arm 54 to move the lock pawl 45 into engagement with the clutch plate 44 thereby causing the web retractor 10" to be in the locked condition or state in which rotation of the spool 14 in the web payout direction is prevented, as described above. When electrically deactivated, the electromagnet 90 does not generate or produce a magnetic field and the lock pawl 45, normally biased away from the teeth of the clutch plate 44, biases the actuating arm 52B toward the opposite wall of the frame 52 of the locking actuator 50 such that the spool 14 may rotate in the web payout direction to pay out the web may be paid out therefrom, as also described above.

It will be understood that in either of the embodiments 10', 10" of the web retractor illustrated in FIGS. 3-5B and 6 respectively, whereas the magnet 80, 90 may be controlled as described above to selectively lock and unlock the respective web retractor 10', 10", the web retractors 10', 10" may remain lockable in a conventional manner under normal operating conditions, e.g., gravity-based and inertial-based locking conditions, and similarly may remain conventionally unlockable under normal static and quasi-static operating conditions. In this regard, in some embodiments which include the control circuit 36 and the electromagnet 90, the control circuit 36 may be programmed to "pre-arm" the locking components 40 of the web retractor 10" by controllably activating the electromagnet 90 in a manner which draws the ferromagnetic ball 56 to a position that is somewhere between the position in which the actuating arm 54 is fully biased by the lock pawl 45 to the closed position illustrated in FIG. 2A and a position in which the ball 56 moves the actuating arm 54 outwardly toward (and against) the lock pawl 45 but does not cause the lock pawl 45 to engage the toothed clutch plate 44. In one embodiment, the control circuit 36 may be so programmed to pre-arm the locking components 40 of the web retractor 10" by controlling the switch 32, or otherwise controlling electrical power supplied to the electromagnet 90, to switch the electromagnet 90 between the activated and deactivated states thereof with at least one of a selected frequency, duty cycle and electrical power magnitude.

It will be further understood that by suitably controlling the frequency, duty cycle and/or magnitude of the electrical power supplied to the electromagnet 90, various different "pre-armed" positions of the ferromagnetic ball 56 relative to the actuating arm 54 may be achieved, and various different pre-armed positions of the lock pawl 45 relative to the toothed clutch plate 44 may therefore be achieved. This feature may be particularly advantageous when coupled with signals provided by the user interface 37 and/or one or more sensors 38 to selectively pre-arm the ferromagnetic ball 56 to any of multiple possible pre-armed positions thereof. As one non-limiting example in which the web retractor 10" is implemented as part of an occupant restraint system for a motor vehicle seat, and which includes a sensor 38 in the form of a weight or pressure sensor operatively coupled to the seat, the control circuit 36 may illustratively be programmed to control the pre-armed position of the ferromagnetic ball 56, e.g., via control of one or more of the frequency, duty cycle and/or magnitude of the electrical power supplied to the electromagnet 90, based on the measured or computed weight of an occupant of the seat. In one embodiment of this example, the pre-armed position of the ball 56 may be so controlled in a manner which moves the lock pawl 45 closer to the toothed clutch plate 44 with decreasing occupant weight. Thus, as occupant weight decreases, so too will the response time to move the ball 56 into the locked position in which the lock pawl 45 comes into contact with the toothed clutch plate 44. The locking web retractor 10" may therefore be made to selectively lock more quickly for lighter passengers, e.g., children, than for heavier passengers. In other embodiments, the pre-armed position of the ball 56 may be controlled in a manner which moves the lock pawl 45 based on one or more alternative or additional occupant weight-based criteria.

As another non-limiting example in which the web retractor 10" is implemented as part of an occupant restraint system for a motor vehicle seat, and which includes the user interface 37, the control circuit 36 may illustratively be programmed to control the pre-armed position of the ferromagnetic ball 56, e.g., via control of one or more of the frequency, duty cycle and/or magnitude of the electrical power supplied to the electromagnet 90, based user input of a weight or weight range of an occupant of the vehicle seat. The pre-armed position of the ball 56 may be controlled in a manner which moves the lock pawl 45 based on one or more occupant weight-based criteria.

Figure 7A:
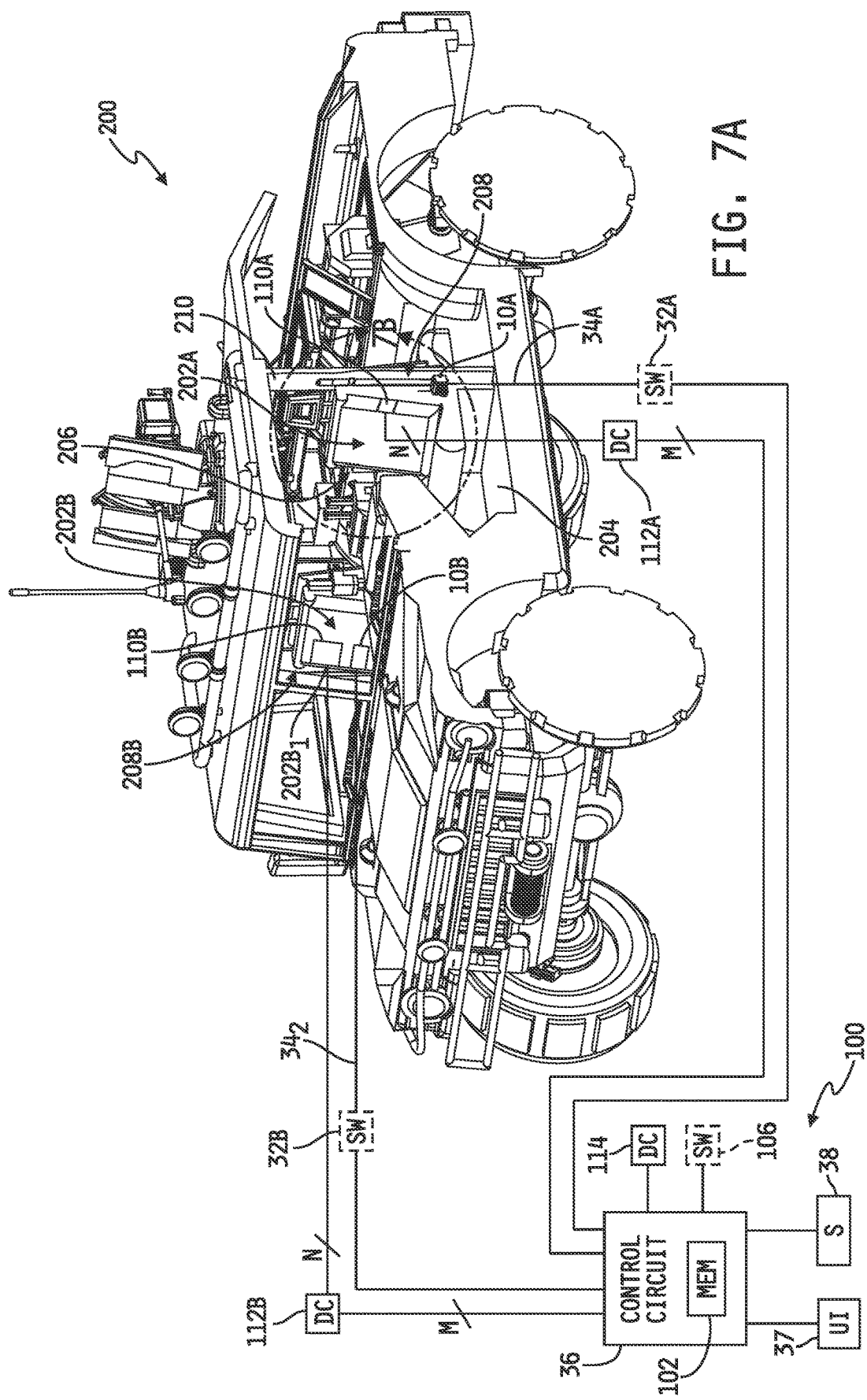
FIG. 7A is a simplified perspective view of a motor vehicle including a pair of occupant seats mounted therein each having an occupant restraint system, including a controllable locking retractor, mounted thereto, and illustrating a simplified embodiment of an control system operatively coupled to the occupant restraint systems for controlling operation of the locking retractors.
Figure 7B:
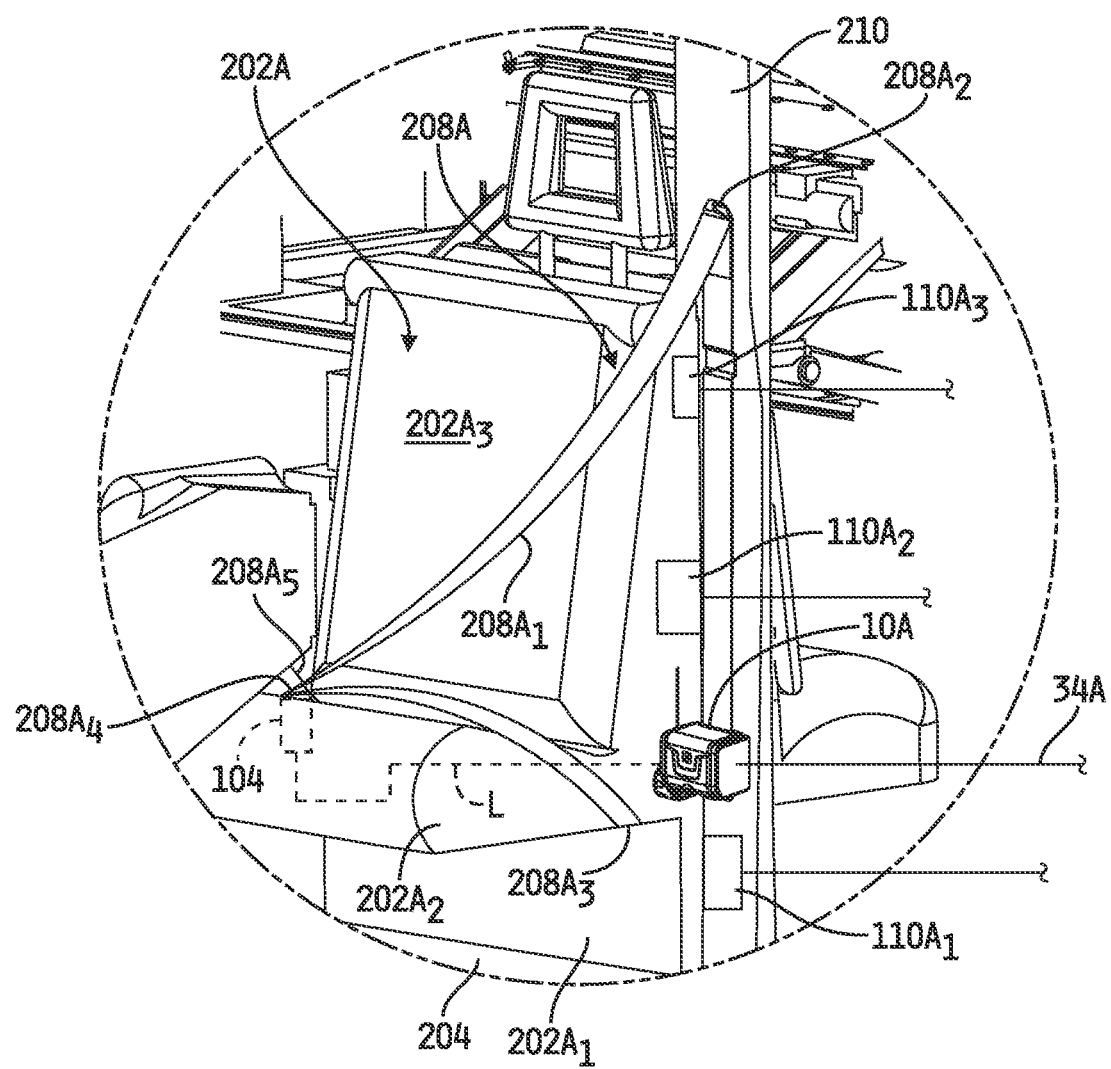
FIG. 7B is a magnified view of one of the occupant seats depicted in FIG. 7A illustrating an embodiment of the occupant restraint system mounted thereto.

Referring now to FIGS. 7A and 7B, a motor vehicle 200 is shown including a pair of occupant seats 202A, 202B mounted in an occupant area 206 of the vehicle 200 and each having a respective occupant restraint system 208A, 208B, including a respective controllable locking retractor 10A, 10B mounted thereto, and illustrating a simplified embodiment of an occupant restraint control system 100 operatively coupled to the occupant restraint systems 208A, 208B for controlling operation of the locking retractors 10A, 10B. The motor vehicle 200 in which the occupant seats 202A, 202B and occupant restraint systems 208A, 208B are to be mounted may be or include any land-based and/or water-based (e.g., any marine application) motor vehicle or any aircraft, without limitation, and/or may be or include any occupant transportation vehicle that is, or is configured to be, towed or pushed thereby. It is to be understood that while two occupant seats 202A, 20B and associated occupant restraint systems 208A, 208B are shown mounted to and within the motor vehicle 200, alternate embodiments are contemplated in which the motor vehicle 200 includes only a single occupant seat and associated occupant restraint system or in which the motor vehicle 200 includes more than two occupant seats each with a respective occupant restraint system mounted thereto. In any such alternate embodiment, the occupant restraint control system 100 may be operatively coupled to one, all or any combination of such occupant restraint systems.

As depicted by example in FIG. 7B, the occupant seat 202A illustratively includes a seat base $202A_1$ mounted to the floor and/or frame component(s) 204 of the motor vehicle 200, a seat bottom $202A_2$ mounted to the seat base $202A_1$ and a seat back $202A_3$ mounted to the seat base $202A_1$ and/or to the seat bottom $202A_2$ and extending upwardly away from the seat bottom $202A_2$. The seat bottom $202A_2$ and the seat back $202A_3$ are conventional in that they are configured to support an occupant seated in the occupant seat 202A. In one embodiment, the occupant seat 202B is identical to the occupant seat 202A, although in alternate embodiments the occupant seat 202B may be configured differently than the vehicle seat 202A while still including a seat bottom and seat back configured to support an occupant of the occupant seat 202B.

As also depicted by example in FIG. 7B, the occupant restraint system 208A illustratively includes a web $208A_1$ having one end operatively mounted to the retractor 10A in a conventional manner such that the web $208A_1$ can be paid into and out of the retractor 10A. In the illustrated embodiment, the retractor 10A is illustratively mounted to a frame component 210 of the motor vehicle 200 and/or to the seat base $202A_1$ and/or to the seat bottom $202A_1$ in a conventional manner, and is illustratively positioned adjacent to or below the seat bottom $202A_2$. In any case, the opposite end $208A_3$ of the web $208A_2$ passes through a web guide $208A_2$ that is illustratively mounted to the frame component 210 (or other frame component or other structure in the motor vehicle 200) above the retractor 10A and adjacent to or above the top of the seat back $202A_3$ along one side of the seat 202A, i.e., such that the web guide $208A_2$ is positioned generally above the left shoulder of an occupant of the seat 202A. In some embodiments, the web guide $208A_2$ may be height-adjustable, i.e., relative to the retractor 10A and/or seat back $202A_3$. From the web guide $208A_2$, the end $208A_3$ of the web $208A_1$ passes through a conventional tongue guide $208A_4$ and is then affixed to the seat base $202A_1$ and/or to the seat bottom $202A_2$ on the same side of the seat 202A as the retractor 10A and the web guide $208A_2$. The occupant restraint system 208A further includes a conventional buckle $208A_5$ mounted to the seat base $202A_1$ and/or to the seat bottom $202A_2$ on an opposite side of the seat 202A.

The illustrated restraint system 208A is a conventional three-point configuration in which the portion of the web $208A_1$ between the web guide $208A_2$ and the tongue guide $208A_4$ defines a shoulder web portion configured to extend diagonally downwardly from the web guide $208A_2$ (across the torso of an occupant of the seat 202A) to the buckle $208A_5$, and the portion of the web $208A_1$ between the tongue guide $208A_4$ and the fixed end $208A_3$ of the web $208A_1$ defines a lap web portion configured to extend across the seat bottom $202A_2$ (and across the lap of an occupant of the seat 202A), when a conventional tongue member of the tongue guide $208A_4$ releasably engages the buckle $208A_5$ as illustrated by example in FIG. 7B. When the tongue member of the tongue guide $208A_4$ is disengaged from the buckle $208A_5$, the retractor 10A takes up slack in the web $202A_1$ so as to position most of the web $202A_1$ outside of the retractor 10A between the retractor 10A and the web guide $208A_2$ as illustrated by example in FIG. 7A. In one embodiment, the occupant restraint system 208B is identical to the occupant restraint system 208A. In alternate embodiments, the occupant restraint system 208A and/or the occupant restraint system 208B may include more or fewer points of restraint, as is known in the art, and in some such alternate embodiments one or more of the occupant restraint systems may incorporate two or more of the controllable web retractors 10A suitably mounted to the motor vehicle 202 and/or a frame component thereof, to the seat base $202A_1$ and/or to the seat bottom $202A_2$ and/or the seat back $202A_3$ of the occupant seat 202A.

In one embodiment of the occupant restraint system 208A depicted in FIGS. 7A and 7B, the controllable locking web retractor 10A is implemented in the form of the controllable locking web retractor 10, 10' or 10" illustrated in FIGS. 1-6 and described above, and the controllable locking web retractor 10B of the occupant restraint system 208B is the same. In embodiments which include more than two occupant restraint systems (i.e., embodiments in which the motor vehicle 200 includes more than two occupant seats) and/or in embodiments in which any occupant restraint system on board the motor vehicle 200 includes more than one controllable locking web retractor, all respective controllable locking web retractors are likewise illustratively implemented in the form of the controllable locking web retractor 10, 10' or 10". In alternate embodiments, one or more of the controllable locking web retractors included in one or more of the occupant restraint system(s) on-board the motor vehicle 200 may alternatively be implemented in one or more other electrically controllable forms, examples of which may include, but are not limited to, locking retractors having one or more mechanical devices actuated (i.e., locked/unlocked) via one or more electrically activated solenoids, switches and/or other electrically controlled actuator(s), locking retractors having one or more fluid sources, e.g., pressurized gas, hydraulic fluid, etc., actuated via one or more electrically activated solenoids, valves, switches and/or other electrically controlled actuator(s).

The occupant restraint control system 100 depicted in FIG. 7A includes the control circuit 36 and the one or more sensors or sensing systems 38, and in some embodiments, the user interface 37, all as illustrated in FIG. 1 and described above. As also described above, the control circuit 36 may include at least one conventional processor and at least one conventional memory unit 102 having instructions stored therein that are executable by the control circuit 36 to control locking/unlocking of each the controllable locking retractors 10A, 10B. In some embodiments, the memory 102 may have stored therein instructions executable by the control circuit 36 to control locking/unlocking of the retractors 10A, 10B together, i.e., in accordance with execution of a single set of instructions. In other embodiments, the memory 102 may have stored therein instructions executable by the control circuit 36 to control locking/unlocking of the retractors 10A, 10B each independently of the other, i.e., each according to a separate set of instructions. In still other embodiments, the memory 102 may have stored therein instructions executable by the control circuit 36 to control locking/unlocking of only one of the retractors 10A, 10B. In any case, the memory unit 102 may be part of, or separate from and operatively coupled to, the control circuit 36.

The one or more sensors or sensing systems 38 may be or include any sensor or sensing system configured to sense an operating condition and/or characteristic of the motor vehicle 200, of any component thereof and/or of any structure or device mounted thereto or therein including, but not limited to, any component(s) of either or both of the occupant seats 202A, 202B and/or any component(s) of either or both of the occupant restraint systems 208A, 208B. It will be understood that any such sensor or sensing system may embodied as one or more physical sensors and/or in the form of one or more virtual sensors, i.e., instructions stored in the memory 102 and executable by the control circuit 36 to estimate or otherwise determine an operating condition or characteristic based, at least in part, on one or more signals produced by one or more sensors or sensing systems which do not directly sense or otherwise measure the operating condition or characteristic. In any case, the memory 102 includes instructions stored therein and executable by the control circuit 36 to process output signals produced by each of the one or more sensors or sensing systems 38 to determine corresponding values for the respective operating condition or characteristic.

Examples of sensors or sensing systems 38 may include, but are not limited to, any one or combination of: (1) one or more conventional vehicle speed sensors suitably mounted to or carried by the motor vehicle 200 and configured to produce one or more signals corresponding to the traveling speed of the motor vehicle 200, (2) one or more conventional weight sensors suitably mounted to or carried by the motor vehicle and configured to produce one or more signals corresponding to the weight of the motor vehicle and from which the control circuit 36 is configured to determine the mass of the motor vehicle 200, (3) one or more conventional occupant weight sensors suitably mounted to the occupant seat 202A and/or 202B and configured to produce one or more signals corresponding to the weight of an occupant seated in the occupant seat 202A and/or 202B, (4) one or more conventional sensors suitably mounted to the occupant seat 202A and/or 202B, to a frame component of the motor vehicle 200 and/or to one or more other structures within the motor vehicle 200 and configured to produce one or more signals corresponding to a position, e.g. fore/aft, of the occupant seat 202A and/or 202B relative to a reference position, (5) one or more conventional sensors suitably mounted to the occupant seat 202A and/or 202B, to the controllable locking retractor 10A and/or 10B to the web $208A_1$ and/or $208B_1$ and/or to one or more other suitable structures within the motor vehicle 200 and configured to produce one or more signals corresponding to the load, i.e., the force, applied to the web $208A_1$ and/or $208B_1$ by an occupant of the seat 202A and/or 202B under dynamic loading conditions, e.g., one or more force sensors, one or more web-length sensors (configured to sense a (changing) length of web $208A_1$, $208B_1$ extending from the retractor 10A, 10B (6) one or more conventional vehicle rotational movement sensors suitably mounted to or carried by the motor vehicle 200 and configured to produce one or more signals corresponding to movement of the motor about one or more vehicle axes, e.g., one or more pitch, roll and/or yaw sensors, (7) one or more conventional vehicle dynamics sensors suitably mounted to the one or more wheels, axle, frame and/or other structure of the motor vehicle 200 and configured to produce one or more signals corresponding to vertical movement of the motor vehicle 200 relative to a reference position of the motor vehicle, e.g., one or more accelerometers configured to sense dynamic vertical movement of the motor vehicle relative to a reference position of the motor vehicle, one or more vehicle height sensors configured to produce one or more signals corresponding to a distance between a point on a suspension, chassis or body of the motor vehicle and a driving surface on which the motor vehicle is being driven, or the like, (8) at least one global positioning system (GPS) sensor suitably mounted to or carried by the motor vehicle 200 and configured to produce one or more signals corresponding to a geographic position of the motor vehicle 200, e.g., latitude, longitude and/or altitude, (9) one or more conventional brake sensors suitably mounted to or within the motor vehicle and configured to produce one or more signals corresponding to brake force applied by service brakes of and to the motor vehicle, e.g., one or more conventional brake pedal sensors configured to produce one or more signals corresponding to an amount of force (and, in some embodiments, rate of force application) applied to a brake pedal of the motor vehicle 200, one or more conventional accelerometers mounted to the motor vehicle 200 and configured to produce one or more signals corresponding to a rate of acceleration of the motor vehicle 200, etc., (10) one or more conventional impact sensors, e.g., one or more accelerometers or the like, suitably mounted to the motor vehicle and configured to produce one or more impact signals from which the control circuit 36 is configured to determine whether an impact of the motor vehicle 200 with another object is occurring or imminent, (11) one or more conventional roll sensors suitably mounted to the motor vehicle 200 and configured to produce one or more signals from which the control circuit 36 is configured to determine whether rollover of the motor vehicle 200 is occurring or imminent, and the like. In embodiments which include the GPS sensor (or other motor vehicle location sensor, system or service), the memory 102 may have stored therein (or the control circuit 36 may otherwise have access to via the Internet or other mobile wireless service) one or more geographical maps via which the control circuit 36 may determine the geographic position of the motor vehicle 200 relative to one or more countries, states, cities, landmarks, terrain topography, etc.

In the embodiment illustrated in FIGS. 7A and 7B, the controllable locking retractor 10A and the controllable locking retractor 10B are each configured to be selectively controlled to and between locked and unlocked states as described above with respect to FIGS. 1-6. In this regard, the occupant restraint control system 100 may, in some embodiments in which the switch 32 is an electromechanical switch or purely an electrical switch, include the switch 32A externally to the control circuit 36 and operatively coupled to and between the control circuit 36 and the retractor 10A, and the switch 32B externally to the control circuit 36 and operatively coupled to and between the control circuit 36 and the retractor 10B as illustrated in FIG. 7A in dashed-line representation. In alternate embodiments in which the switch 32 is purely an electrical component, the switch 32A and/or the switch 32B may be part of the control circuit 36, in which case the external switch 32A and/or the external switch 32B may be omitted. In any case, the control circuit 36 is operable to control operation of the switch 32A, 32B, and thus the locking state of the locking retractor 10A, 10B by providing a retractor lock signal to the switch 32A/32B to which the switch 32A/32B is responsive to lock the retractor 10A/10B and by providing a retractor unlock signal to the switch 32A/32B to which the switch 32A/32B is responsive to unlock the retractor 10A/10B as described above.

In some embodiments, the occupant restraint control system 100 may optionally include a manually activated switch 104 operatively coupled to the locking retractor 10A via a mechanical linkage, L, as illustrated in FIG. 7B in dashed-line form, and responsive to manual actuation thereof to override control of the locking/unlocking state of the retractor 10A by the control circuit 36 and manually unlock (and/or lock) the locking retractor 10A. In some embodiments, a similar or identical manual override switch may be coupled in like manner to the locking retractor 10B. In either case, the switch 104 may be suitably located so as to be readily accessible by an occupant of the respective occupant seat 202A, 202B. In the illustrated embodiment, for example, the switch 104 may be coupled to, or integrated into, the tongue guide $208A_4$, the buckle $208A_5$, the seat bottom $202A_2$, the seat base $202A_1$ or other structure within reach of an occupant of the seat 202A, 202B. In some embodiments, a manually activated override switch 106 may be suitably mounted within the motor vehicle 200 and electrically coupled to the control circuit 36, and the memory 102 may have stored therein instructions executable by the control circuit 36 to be responsive to manual activation of the switch 106 to override control of the locking/unlocking state of the retractor 10A and/or the retractor 10B by the control circuit 36 and manually unlock (and/or lock) the locking retractor 10A and/or the retractor 10B. The switch 106 may be coupled to, or integrated into, the tongue guide $208A_4$, the buckle $208A_5$, the seat bottom $202A_2$, the seat base $202A_1$ or other structure within reach of an occupant of the seat 202A, 202B, a console of the motor vehicle 200, a dashboard or instrument panel of the motor vehicle, or other suitable structure within the motor vehicle 200.

In the embodiment illustrated in FIGS. 7A and 7B, the occupant restraint control system 100 may, in addition to the controllable locking retractor 10A, include any number, N, of additional electrically actuated occupant restraint devices 110A mounted to the occupant seat 10A and operatively coupled to the control circuit 36 via one or more conventional drive circuits 112A for control by the control circuit 36 to activate/deactivate respective actuators of such one or more occupant restraint devices 110A, where N may be any positive integer. In some embodiments, any number, N, of additional occupant restraint device 110B may alternatively or additionally be mounted to the occupant seat 10B and operatively coupled to the control circuit 36 via one or more conventional drive circuits 112B for control by the control circuit 36 to activate/deactivate respective actuators of such one or more occupant restraint devices 110B. Each of the N occupant restraint devices 110A, 110B may have a dedicated drive circuit 112A or multiple drive circuits 112A, or one or more of the drive circuits 112A may be used to drive multiple occupant restraint devices 110A. As such, the drive circuit 112A (and the drive circuit 112B) is illustrated in FIG. 7A and being electrically coupled to the control circuit 36 via a number, M, of signal paths, where M may be any positive integer which may be less than N, equal to N or greater than N.

In the embodiment illustrated in FIG. 7B, N=M=3 such that the illustrated occupant restraint system control 100 includes three additional occupant restraint devices $110A_1$, $110A_2$ and $110A_3$ each having a dedicated signal path coupled to a respective, dedicated one of three separate drive circuits 112A. It will be understood that the occupant restraint control system 100 may, as depicted in FIG. 7B, include all three additional occupant restraint devices $110A_1$, $110A_2$ and $110A_3$, may instead include none of the additional occupant restraint devices $110A_1$, $110A_2$ and $110A_3$, or may instead include any sub-combination of the additional occupant restraint devices $110A_1$, $110A_2$ and $110A_3$. In embodiments which include it, the occupant restraint device $110A_1$ is illustratively a conventional occupant seat pull-down device and in such embodiments the occupant seat 202A is accordingly a conventional suspension seat including one or more biasing structures for biasing the combination of the eat bottom $202A_2$ and seat back $202A_3$ above, and spaced apart from, the seat base $202A_1$. One example of such an occupant seat pull-down device, which should not be considered to be limiting in any way, is disclosed in U.S. Pat. No. 9,896,006, the disclosure of which is incorporated herein by reference in its entirety. In any case, the occupant seat pull-down device $110A_1$ illustratively includes at least one actuator responsive to an actuator activation signal produced by the control circuit 36 and converted by the drive circuit 112A to a corresponding drive signal, to cause the occupant seat pull-down device $110A_1$ to pull the combination of the seat bottom $202A_2$ and the seat back $202A_3$, downwardly toward the seat base $202A_1$ in a conventional manner. In some embodiments, the occupant seat pull-down device $100A_1$ may be resettable such that the at least one actuator associated with the device $100A_1$ is responsive to an actuator deactivation signal produced by the control circuit 36 and converted by the drive circuit 112A to a corresponding deactivation drive signal, to cause the occupant seat pull-down device $110A_1$ to return the combination of the seat bottom $202A_2$ and the seat back $202A_3$, upwardly from the seat base $202A_1$ toward and to the suspended position above the seat base $202A_1$. In other embodiments, the occupant seat pull-down device $100A_1$ may not be resettable and must instead be replaced following activation thereof as just described.

In embodiments which include it, the occupant restraint device $110A_2$ is illustratively a conventional web pre-tensioning device. One example of such a web pre-tensioning device, which should not be considered to be limiting in any way, is disclosed in U.S. Pat. No. 9,896,006, the disclosure of which has been incorporated herein by reference in its entirety. In any case, the web pre-tensioning device $110A_2$ illustratively includes at least one actuator responsive to an actuator activation signal produced by the control circuit 36 and converted by the drive circuit 112A to a corresponding drive signal, to cause the web pre-tensioning device $110A_2$ to pretension, or tighten, the web $208A_1$ about an occupant of the seat 202A, e.g., by reducing slack in one or more portions of the web $208A_1$, in a conventional manner. In some embodiments, the web pre-tensioning device $110A_2$ may be configured to pretension only the shoulder web portion(s) of the web $208A_1$, in other embodiments the web pre-tensioning device $110A_2$ may be configured to pretension only the lap web portion(s) of the web $208A_1$ and in still other embodiments the web pre-tensioning device $110A_2$ may be configured to pretension both the shoulder and the lap web portion(s) of the web $208A_1$. Illustratively, the web pre-tensioning device $100A_2$ is resettable such that the at least one actuator associated with the device $100A_2$ is responsive to an actuator deactivation signal produced by the control circuit 36 and converted by the drive circuit 112A to a corresponding deactivation drive signal, to cause the web pre-tensioning device $110A_1$ to loosen the web $208A_1$, e.g., by introducing more slack therein.

In embodiments which include it, the occupant restraint device $110A_3$ is illustratively provided in the form of at least one conventional supplemental inflatable restraint device mounted to and/or integral with the occupant seat 202A, and/or mounted to and/or integral with one or more structures adjacent to the seat 202A. The supplemental inflatable restraint device(s) $110A_3$ illustratively includes at least one actuator responsive to an actuator activation signal produced by the control circuit 36 and converted by the drive circuit 112A to a corresponding drive signal, to cause the occupant seat pull-down device $110A_1$ to deploy in a conventional manner toward and/or about the head and/or torso of an occupant of the seat 202A. Illustratively, the supplemental inflatable restraint device(s) $100A_1$ is/are not resettable and must instead be replaced following activation thereof as just described.

In some embodiments, the occupant restraint control system 100 may further include one or more warning or notification devices 114 suitably mounted to and within the motor vehicle 200 and electrically coupled to the control circuit 36. In such embodiments, the memory 102 illustratively has stored therein instructions executable by the control circuit 36 to activate one or more of the one or more warning or notification devices 114. In some embodiments, the one or more warning or notification devices 114 may be or include one or more illumination devices suitably mounted to the dashboard or instrument cluster and/or other suitable structure of the motor vehicle 200. Alternatively or additionally, the one or more warning or notification devices 114 may be or include one or more audible devices suitably mounted to the dashboard or instrument cluster and/or other suitable structure of the motor vehicle 200. Alternatively or additionally still, the one or more warning or notification devices 114 may be or include one or more tactile, e.g., vibration, devices suitably mounted to the occupant seat 202A and/or other suitable structure of the motor vehicle 200.

Figure 8:
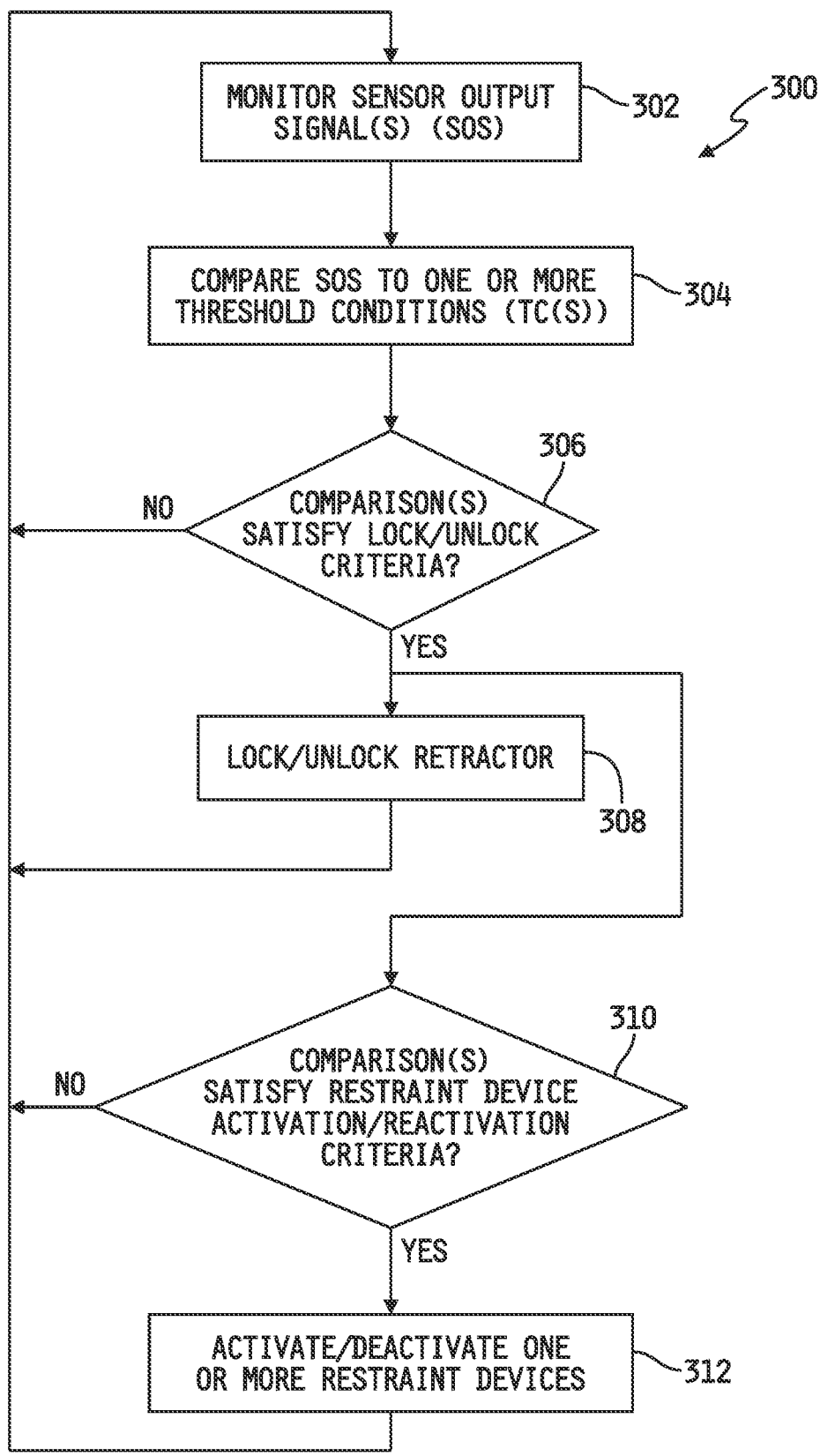
FIG. 8 is a simplified flowchart illustrating an embodiment of a process for controlling operation of one or more of the occupant restraint systems illustrated in FIGS. 7A and 7B.

Referring now to FIG. 8, a simplified flowchart is shown illustrating an example embodiment of a process 300 for controlling operation of the controllable locking web retractor 10A or 10B and for controlling operation of one or more of the occupant restraint devices 110A and/or one or more of the warning or notification devices 114. In one embodiment, the controllable locking web retractors 10A and 10B the one or more warning or notification devices 114, if included, and the one or more occupant restraint devices 110A and 110B, if included, are controlled together, i.e., identically, during each execution of the process 300 as described below. In alternate embodiments, the process 300 may be executed separately and independently for each occupant seat 202A, 202B. In any case, the process 300 is illustratively stored in the form of instructions stored in the memory 102 and executable by the control circuit 36 to carry out the functionality of the process 300 as described below.

The process 300 begins at step 302 where the control circuit 36 is operable to monitor the sensor output signals produced by one or any combination of the one or more sensors or sensing systems 38. It will be understood that embodiments may differ as to the particular one or combination of sensor signals that may be monitored at step 302, and those skilled in the art will recognize that the output signal(s) of any one or combination of the example sensors described above with respect to FIG. 7A, and/or any other conventional sensors generally known to be implemented in motor vehicles, may be monitored at step 302.

In any case, the process 300 advances from step 302 to step 304 where the control circuit 36 is operable to compare one or more of the monitored sensor output signals to one or more threshold conditions. As used herein, the term "one or more threshold conditions" will be understood to mean one or any combination of: (1) a threshold value or range value for an operating condition of the motor vehicle 200 or component carried thereby against which an instantaneous value of that operating condition, as determined by the control circuit 36 by processing the output signal of a corresponding one of the one or more sensors or sensing systems 38, can be compared by the control circuit 36, e.g., a threshold vehicle speed of 40 mph (or vehicle speed range of 30-50 mph), against which an instantaneous vehicle speed value, determined by the processor 36 based on the output signal produced by a vehicle speed sensor operatively mounted to the motor vehicle 200, can be compared by the processor circuit 36, (2) a threshold value or range value for an operating condition of the motor vehicle 200 or component carried thereby against which time-averaged value of that operating condition, as determined by the control circuit 36 by processing the output signal of a corresponding one of the one or more sensors or sensing systems 38, can be compared by the control circuit 36, e.g., a threshold vehicle speed of 40 mph (or vehicle speed range of 30-50 mph), against which a time-averaged vehicle speed value, determined by the control circuit 36 by determining instantaneous vehicle speed values over a specified time period based on the output signal produced by a vehicle speed sensor operatively mounted to the motor vehicle 200 and then determining an average vehicle speed value based on the instantaneous speed values and the specified time period, can be compared by the processor circuit 36, and (3) a threshold value or range value for an operating condition of the motor vehicle 200 or component carried thereby against which an instantaneous or time-averaged value of that operating condition, as determined by the control circuit 36 based on processing of the output signals of two or more particular ones of the one or more sensors or sensing systems 38, can be compared by the control circuit 36, e.g., a medium ride comfort range (e.g., as between low, medium and high ride comfort ranges) against which an a instantaneous or time-averaged ride comfort value, determined by the processor 36 by according to a stored ride comfort model defined as a function of instantaneous or time-averaged values of output signals produced by, for example, a web load sensor operatively mounted to the occupant seat 202A, a vehicle speed sensor operatively mounted to the motor vehicle 200 and a vehicle dynamics sensor(s) operatively mounted to the frame or other component of the motor vehicle 200. In any case, the one or more threshold conditions at step 304 may be any one or a combination of: (1) static values stored in the memory unit 102, (2) dynamically determined values by the control circuit 36 based on instantaneous and/or time-averaged values of output signals produced by at least one of the one or more sensors or sensing systems 38, and (3) initially static values stored in the memory unit 102 which may then be altered by the control circuit 36 based on instantaneous and/or time-averaged values of output signals produced by at least one of the one or more sensors or sensing systems 38. As one example of scenario (3), the ride comfort range described above may initially be a static value stored in the memory unit 102, which initial value may then be altered by the control circuit 36 based on a determination by the processor 36 of the weight of an occupant of the seat 202A according to the output signal produced by a weight sensor operatively mounted to the seat bottom 202A$_2$ of the occupant seat 202A. As a variation on this example, the ride comfort range may include a number of different value, e.g., in the form of a table, stored in the memory unit 102, and the control circuit 36 may be operable to select one of the comfort range values based on the weight of the occupant of the seat 202A.

Following step 304, the process 300 advances to step 306 where the control circuit 36 is operable to determine whether any of the one or more comparisons executed at step 304 satisfy one or more respective criteria for locking or unlocking the retractor 10A (and/or 10B). It will be appreciated that the criteria for locking and/or unlocking the retractor 10A (and/or 10B) may be numerous and varied, and will generally depend on the number(s) and type(s) of sensors included in the one or more sensors or sensing systems 38. Some simple examples may include, but are not limited to, locking/unlocking the retractor 10A when the load applied by an occupant of the seat 202A exceeds/drops below a load threshold or range, locking/unlocking the retractor 10A when the vehicle dynamics sensor signal(s) indicates a ride condition which exceeds a rough ride threshold or drops below a smooth ride threshold, locking the retractor 10A when the impact sensor signal value exceeds an impact threshold and/or when the roll sensor signal value exceeds a roll over threshold, selectively unlocking the retractor 10A under smooth ride conditions of sufficient duration as an anti-cinch or cinch relief feature, i.e., to release some amount of web from the retractor 10A to provide for some respective amount of slack in the web 208A about the lap and/or torso of the seat occupant, etc. Other locking/unlocking events of the retractor 10A (and/or 10B) based on the output signals produced by the one or more sensors or sensing systems 38 relative to one or more threshold or range values will occur to those skilled in the art, and it will be understood that any such other locking/unlocking events of the retractors 10A (and/or 10B) are contemplated by this disclosure. Following step 306, the process 300 advances to step 308 where the control circuit 36 is operable to produce and provide a retractor lock/unlock signal to the switch 32A/32B to which the switch 32A/32B is responsive to lock/unlock the retractor 10A/10B as described above. As one non-limiting example of steps 304-308 in which the one or more sensors or sensing systems 38 includes at least one vehicle dynamics sensor configured to produce at least one respective vehicle dynamics sensor output signal corresponding to vertical movement of the motor vehicle relative to a reference position of the motor vehicle, the memory 102 may have stored therein at least one vertical movement threshold or range value, and the instructions stored in the memory 102 may further include instructions executable by the control circuit 36 to produce a control signal for locking the web retractor 10A and/or 10B if the at least one respective vehicle dynamics sensor output signal exceeds the at least one vertical movement threshold or range value. As another non-limiting example of steps 304-308 in which the one or more sensors or sensing systems 38 further includes a vehicle weight sensor configured to produce a vehicle weight sensor output signal corresponding to a weight of the motor vehicle, the memory may have stored therein a plurality of vertical movement thresholds or range values each for a different value or range of motor vehicle weights, and the instructions stored in the memory may further include instructions executable by the control circuit to process the vehicle weight sensor output signal to determine a weight of the motor vehicle, and to produce a control signal for locking the web retractor if the at least one respective vehicle dynamics sensor output signal exceeds the vertical movement threshold or range value for the respective value or range of motor vehicle weights matching the determined weight of the motor vehicle. In any case, in some embodiments, activation/deactivation of one or more warning or notification devices 114 by the control circuit 36 may precede or accompany the retractor lock/unlock signal produced by the control circuit 36 at step 308.

In embodiments which include one or more of the electrically actuated occupant restraint devices 110A, 110B, the process 300 also illustratively includes steps 310 and 312 in which the control circuit 36 determines whether and when to activate and/or deactivate one or more of the occupant restraint devices 110A, 110B. At step 310, the control circuit 36 is operable to determine whether the comparison(s) executed at step 304 satisfy activation or deactivation criteria for one or more of the occupant restraint devices 110A, 110B. In the embodiment illustrated in FIG. 7B, the occupant restraint system 208A, 208B includes three such occupant restraint devices 110A: (1) a seat pull-down device $110A_1$, (2) a web pre-tensioning device $110A_2$ and an inflatable restraint device $110A_3$. In some alternate embodiments, the restraint system 208A, 208B may include only a single one or any sub-combination of the occupant restraint devices $110A_1$, $100A_2$, and $110A_3$, and in other alternate embodiments the restraint system 208A, 208B may include more than three such occupant restraint devices or none of the occupant restraint devices $110A_1$, $100A_2$, $110A_3$.

In embodiments of the process 300 which include steps 310 and 312, the comparison(s) executed at step 304 illustratively include comparisons with respect to threshold and/or range values for each of the occupant restraint devices 110A, 110B, wherein each such occupant restraint device threshold and/or range value may be implemented in any of the ways described above with respect to step 304. In some instances, depending upon the sensor(s) 38 and/or the particular occupant restraint device(s) $110A_1$, $100A_2$, $110A_3$, involved in the comparison(s), the activation/deactivation criteria may be the same as for the lockable retractor 10A, 10B i.e., the lockable retractor 10A, 10B and the occupant restraint device(s) $110A_1$, $100A_2$, $110A_3$ may be activated/deactivated together, simultaneously or one after the other. In other instances, again depending upon the sensor(s) 38 and/or the particular occupant restraint device(s) $110A_1$, $100A_2$, $110A_3$, involved in the comparison(s), the activation/deactivation criteria for the occupant restraint device(s) $110A_1$, $100A_2$, $110A_3$ may be different from that/those of the lockable retractor 10A, 10B. In some such instances, the activation/deactivation criteria for the occupant restraint device(s) $110A_1$, $100A_2$, $110A_3$ may be greater that/those of the lockable retractor 10A, 10B i.e., a higher threshold and/or range of sensor output value(s) required for activation/deactivation, and in other instances the activation/deactivation criteria for the occupant restraint device(s) $110A_1$, $100A_2$, $110A_3$ may be less than that/those of the lockable retractor 10A, 10B i.e., a lower threshold and/or range of sensor output value(s) required for activation/deactivation. In any case, following step 310 the process 300 advances to step 312 where the control circuit 36 is operable to produce and provide an occupant restraint activation/deactivation signal to the actuator of each applicable one of the occupant restraint devices $110A_1$, $100A_2$, $110A_3$ to activate or deactivate the associated occupant restraint device $110A_1$, $100A_2$, $110A_3$. In some embodiments, activation/deactivation of one or more warning or notification devices 114 by the control circuit 36 may precede or accompany the occupant restraint activation/deactivation signal produced by the control circuit 36 at step 312. Following each of steps 308 and 312, as well as from the "NO" branches of steps 306, 310, the process 300 loops back to step 302.

Figure 9:
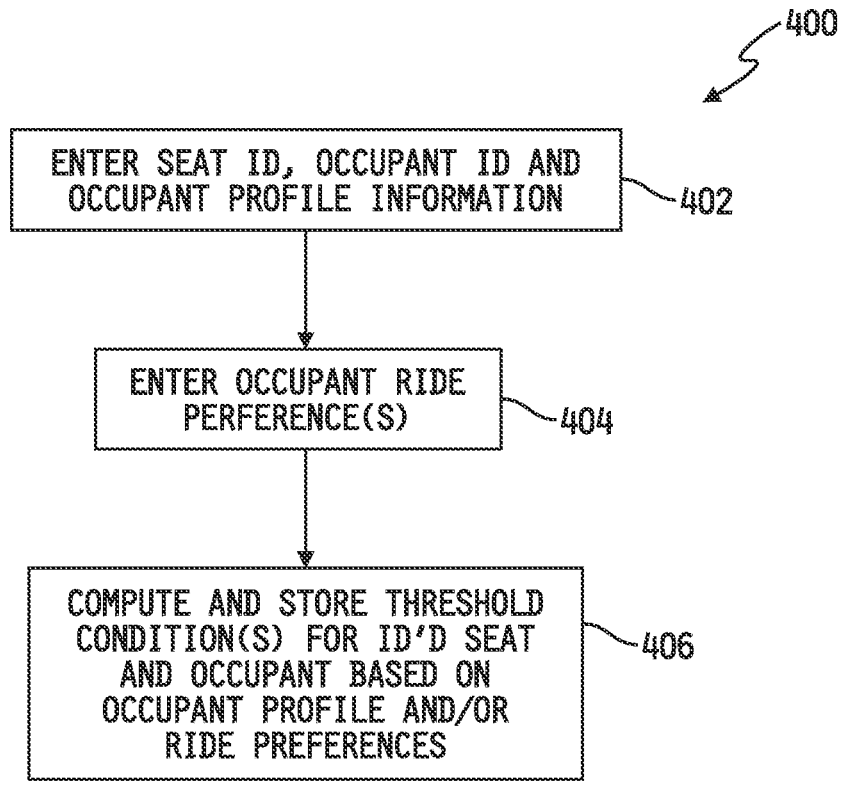
FIG. 9 is a simplified flowchart illustrating an embodiment of a process for customizing the process of FIG. 8 to be applied to the occupant restraint system of a particular occupant seat and/or for a particular occupant of that seat.

In embodiments which include the user interface 37, the user interface 37 may illustratively be or include a motor vehicle-mounted viewing monitor and manually selectable inputs in the form of one or touch-screen buttons, or other buttons or switches, and/or partial or full on-screen or separate keyboard or keypad. In alternate embodiments, the user interface 37 may be a hand-held mobile device, such as a mobile telephone or other mobile device configured to communicate in a conventional manner with the control circuit 36 via a wired and/or wireless interface. In any such embodiments, the occupant restraint control system 100 may be programmable with seat and/or occupant information, and in such embodiments the control circuit 36 may be operable to determine, set and/or modify one or more one or more of the retractor lock/unlock criteria queried at step 304 of the process 300 and/or one or more of the occupant restraint device activation/deactivation criteria queried at step 310 of the process 300, based on the programmed seat and/or occupant information. Referring to FIG. 9, for example, a simplified flowchart is shown of a process 400 for programming the occupant restraint system 100 as just described. The process 400 is illustratively stored in the memory 102 in the form of instructions executable by the control circuit 36 to carry out the functionality of the process 400 as described below. It will be understood that in executing the process 400, steps requiring manual entry of information will typically be displayed by the control circuit 36 on the monitor of the user interface 37 in the form of instructions requiring manual entry of corresponding information by the user via one or more of the selectable inputs.

The process 400 illustratively begins at step 402 where the control circuit 36 is operable to control the monitor of the user interface 37 to display instructions for entering a seat ID, i.e., an identifier of the occupant seat 202A, 202B being programmed, an occupant ID, i.e., an identifier of the occupant of the seat, e.g., name or other identifier, and profile information of the occupant. The profile information may illustratively include, but is not limited to, one or any combination of gender, height, weight, age, relevant health condition(s), relevant physical limitations, etc. In some embodiments in which the occupant seat 202A, 202B includes a weight sensor, the control circuit 36 may control the user interface 37 to display the current weight of the occupant seated in the seat and request confirmation in lieu of user entry of the occupant weight.

After the user supplies the information to the system 100 at step 402, the process 400 advances to step 404 where the control circuit 36 is operable to control the monitor of the user interface 37 to display instructions for entering one or more ride preferences of the identified occupant. The ride preferences may illustratively include, but are not limited to, locking/unlocking response (e.g., frequency, hysteresis, etc.) of the retractor 10A, 10B and/or of the web pre-tensioning device 110A$_2$, e.g., smooth, rough, sport, comfort, etc., web cinch relief (as briefly described above) on or off, or the like. Following step 404, the process 400 advances to step 406 where the control circuit 36 is operable to compute and store one or more threshold and/or range conditions or values, or compute and store one or more modifier values for modifying one or more threshold or range conditions or values, for the identified seat and occupant based on the information provided at step 402 and 404. It will be understood that whereas the process 400 illustrated in FIG. 9 includes steps 402 and 404, alternate embodiments are contemplated in which step 404 may be omitted and/or in which the occupant profile information may be omitted.

Figure 10:
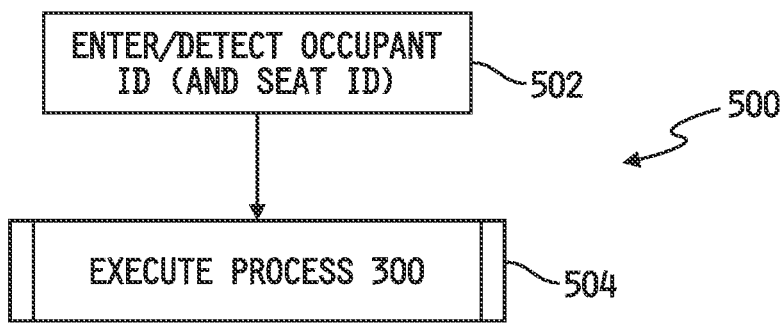
FIG. 10 is a simplified flowchart illustrating an embodiment of a process for executing the process of FIG. 8 as customized according to the process illustrated in FIG. 9.

Referring now to FIG. 10, a simplified flowchart is shown of a process 500 via which the control circuit 36 can determines its programming, if any, with respect to any particular occupant seat in the motor vehicle 200. The process 500 is illustratively stored in the memory 102 in the form of instructions executable by the control circuit 36 to carry out the functionality of the process 500 as described below. The process 500 illustratively begins at step 502 where, the control circuit 36 is operable to control the monitor of the user interface 37 to display instructions, e.g., at start-up of the motor vehicle 200, to enter the seat and/or occupant ID. In some alternate embodiments, the control circuit 36 may instead be operable to detect both such identifiers, e.g., by detection of an occupant in the seat and comparison of the weight of the occupant to stored values. In other alternate embodiments, the control circuit 36 may control the monitor of the user interface 37 to display for one or more of the seats 202A, 202B the most recently entered or detected occupant ID and request confirmation or use such occupant ID if no alternate occupant ID is entered within a specified time period. In any case, the process 500 advances from step 502 to step 504 where the control circuit 36 is operable to execute the process 300 for one or more of the occupant seats 202A, 202B based on the entered or detected occupant and seat ID's.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected.

What is claimed is:

1. A system for controlling operation of an electrically controlled and magnetically actuated locking web retractor of an occupant restraint operatively coupled to an occupant seat of a motor vehicle, the system comprising:
   one or more sensors or sensing systems operatively mounted to at least one of the occupant restraint, the occupant seat and the motor vehicle, and configured to produce one or more respective sensor output signals indicative of one or more corresponding sensed conditions,
   a control circuit, and
   a memory unit having stored therein instructions executable by the control circuit to (i) process the one or more sensor output signals to determine one or more values of the one or more sensed conditions, (ii) compare the one or more determined values of the one or more sensed conditions to one or more corresponding threshold or range values, (iii) produce a control signal, based on the one or more comparisons, for locking or unlocking of the web retractor, and (iv) provide the control signal to a magnet actuator of the web retractor to cause the web retractor to lock or unlock,
   wherein the electrically controlled and magnetically actuated locking web retractor comprises:
      a frame including spaced-apart side walls,
      a spool rotatably mounted between the side walls, the spool rotatable in a web take-up direction and web a payout direction opposite the web take-up direction,
      locking components,
      a ferromagnetic component movable relative to the locking components between an unlocking position in which the ferromagnetic component does not cause the locking components to prevent the spool from rotating in the web pay out direction and a locking position in which the ferromagnetic component causes the locking components to prevent the spool from rotating in the web pay out direction,
      a magnet responsive to actuation to cause the ferromagnetic component to move from the unlocking position to the locking position, and responsive to de-actuation to cause the ferromagnetic component to move from the locking position to the unlocking position, and
      the magnet actuator, the magnet actuator configured to be responsive to the control signal to actuate and de-actuate the magnet.

2. The system of claim 1, wherein the magnet comprises an electromagnet,
   wherein actuating the magnet comprises supplying electrical power to the electromagnet to cause the electromagnet to produce a magnetic field configured to move the ferromagnetic component from one of the locking and unlocking positions to the other of the locking and unlocking positions thereof,
   and wherein the magnet actuator comprises a switch operatively coupled to a source of electrical power and to the electromagnet, the switch responsive to a first control signal produced by the control circuit to supply electrical power from the source of electrical power to the electromagnet.

3. The system of claim 2, wherein de-actuating the magnet comprises removing electrical power from the electromagnet to cause the electromagnet to cease producing the magnetic field,
and wherein, in the absence of the magnetic field, the locking components are configured to move the ferromagnetic component from the other of the locking and unlocking positions to the one of the locking and unlocking positions,
and wherein the switch is responsive to a second control signal to remove the electrical power from the electromagnet.

4. The system of claim 2, further comprising a housing secured to the frame adjacent to the locking components,
wherein the electromagnet is mounted to the housing and positioned relative to the locking components such that the magnetic field produced by the electromagnet in response to supply of the electrical power thereto causes the ferromagnetic component to move from the unlocking position to the locking position.

5. The system of claim 2, wherein the control circuit includes the electronic switch.

6. The system of claim 2, wherein the switch is external to the control circuit.

7. The system of claim 1, wherein the one or more sensors or sensing systems includes one or any combination of (i) a vehicle speed sensor configured to produce a vehicle speed sensor output signal corresponding to traveling speed of the motor vehicle, (ii) a vehicle weight sensor configured to produce a vehicle weight sensor output signal corresponding to a weight of the motor vehicle, (iii) an occupant weight sensor configured to produce an occupant weight sensor output signal corresponding to a weight of an occupant seated in the occupant seat, (iv) an occupant seat position sensor configured to produce an occupant seat position sensor output signal corresponding to a position of the occupant seat relative to a reference position, (v) a web load sensor configured to produce a web load sensor output signal corresponding to a force applied by an occupant of the occupant seat to at least one restraint web of the occupant restraint, (vi) at least one vehicle rotational movement sensor configured to produce a vehicle rotational movement sensor output signal corresponding to movement of the motor vehicle about at least one axis of the motor vehicle, (vii) at least one vehicle dynamics sensor configured to produce a vehicle dynamics sensor output signal corresponding to vertical movement of the motor vehicle relative to a reference position of the motor vehicle, (viii) at least one global positioning system (GPS) sensor configured to produce a GPS sensor signal output corresponding to a geographical position of the motor vehicle, (ix) a brake sensor configured to produce a brake sensor output signal corresponding to brake force applied by service brakes of and to the motor vehicle, (x) an impact sensor configured to produce an impact output signal from which the control circuit can determine whether an impact of the motor vehicle with an object is occurring or imminent, and (xi) a roll sensor configured to produce a roll sensor output from which the control circuit can determine whether rollover of the motor vehicle is occurring or imminent.

8. The system of claim 1, wherein the one or more sensors or sensing systems includes at least one vehicle dynamics sensor configured to produce at least one respective vehicle dynamics sensor output signal corresponding to vertical movement of the motor vehicle relative to a reference position of the motor vehicle,
and wherein the memory has stored therein at least one vertical movement threshold or range value,
and wherein the instructions stored in the memory further include instructions executable by the control circuit to produce a control signal for locking the web retractor if the at least one respective vehicle dynamics sensor output signal exceeds the at least one vertical movement threshold or range value.

9. The system of claim 8, wherein the one or more sensors further includes at least one vehicle weight sensor configured to produce a vehicle weight sensor output signal corresponding to a weight of the motor vehicle,
and wherein the memory has stored therein a plurality of vertical movement thresholds or range values each for a different value or range of motor vehicle weights,
and wherein the instructions stored in the memory further include instructions executable by the control circuit to process the vehicle weight sensor output signal to determine a weight of the motor vehicle, and to produce a control signal for locking the web retractor if the at least one respective vehicle dynamics sensor output signal exceeds the vertical movement threshold or range value for the respective value or range of motor vehicle weights matching the determined weight of the motor vehicle.

10. A method for controlling operation of an electrically controlled and magnetically actuated locking web retractor of an occupant restraint operatively coupled to an occupant seat of a motor vehicle, wherein the electrically controlled and magnetically actuated locking web retractor comprises a frame including spaced-apart side walls, a spool rotatably mounted between the side walls, the spool rotatable in a web take-up direction and web a payout direction opposite the web take-up direction, locking components, a ferromagnetic component movable relative to the locking components between an unlocking position in which the ferromagnetic component does not cause the locking components to prevent the spool from rotating in the web pay out direction and a locking position in which the ferromagnetic component causes the locking components to prevent the spool from rotating in the web pay out direction, a magnet responsive to actuation to cause the ferromagnetic component to move from the unlocking position to the locking position, and responsive to de-actuation to cause the ferromagnetic component to move from the locking position to the unlocking position, and a magnet actuator configured to be responsive to a control signal to actuate and de-actuate the magnet, the method comprising:
monitoring, by a control circuit, output signals produced by one or more sensors or sensing systems operatively mounted to at least one of the occupant restraint, the occupant seat, and the motor vehicle, and configured to produce one or more respective sensor output signals indicative of one or more corresponding sensed conditions,
processing, by the control circuit, the output signals produced by the one or more sensors or sensing systems to determine one or more values of the one or more sensed conditions,
comparing, by the control circuit, the one or more determined values of the one or more sensed conditions to one or more corresponding threshold or range values, and providing, by the control circuit, the control signal, based on the one or more comparisons, to actuate or de-actuate the magnet.

11. The method of claim 10, wherein the magnet comprises an electromagnet,
and wherein actuating the magnet comprises supplying electrical power to the electromagnet to cause the electromagnet to produce a magnetic field configured to move the ferromagnetic component from one of the locking and unlocking positions to the other of the locking and unlocking positions thereof,
and wherein the magnet actuator comprises a switch operatively coupled to a source of electrical power and to the electromagnet,
and wherein providing the control signal in the form of a magnet actuation signal comprises providing a first control signal to the switch to cause the switch to supply electrical power from the source of electrical power to the electromagnet.

12. The method of claim 11, wherein de-actuating the magnet comprises removing electrical power from the electromagnet to cause the electromagnet to cease producing the magnetic field,
and wherein, in the absence of the magnetic field, the locking components are configured to move the ferromagnetic component from the other of the locking and unlocking positions to the one of the locking and unlocking positions,
and wherein providing the control signal in the form of a magnet de-actuation signal comprises providing a second control signal to the switch to cause the switch to remove the electrical power from the electromagnet.

13. The method of claim 10, wherein the one or more sensors or sensing systems includes at least one vehicle dynamics sensor configured to produce at least one respective vehicle dynamics sensor output signal corresponding to vertical movement of the motor vehicle relative to a reference position of the motor vehicle,
and wherein the memory has stored therein at least one vertical movement threshold or range value,
and wherein providing the control signal to the magnet actuator of the web retractor to cause the web retractor to lock or unlock comprises providing a control signal for locking the web retractor if the at least one respective vehicle dynamics sensor output signal exceeds the at least one vertical movement threshold or range value.

14. The method of claim 13, wherein the one or more sensors further includes at least one vehicle weight sensor configured to produce a vehicle weight sensor output signal corresponding to a weight of the motor vehicle,
and wherein the memory has stored therein a plurality of vertical movement thresholds or range values each for a different value or range of motor vehicle weights,
and wherein the method further includes processing the vehicle weight sensor output signal to determine a weight of the motor vehicle,
and wherein
and wherein providing the control signal to the magnet actuator of the web retractor to cause the web retractor to lock or unlock comprises providing a control signal for locking the web retractor if the at least one respective vehicle dynamics sensor output signal exceeds the vertical movement threshold or range value for the respective value or range of motor vehicle weights matching the determined weight of the motor vehicle.

15. A system for controlling operation of an electrically controlled and magnetically actuated locking web retractor of an occupant restraint operatively coupled to an occupant seat of a motor vehicle, the system comprising:
at least one sensor configured to produce at least one sensor output signal corresponding to at least one corresponding operating condition of the motor vehicle,
a control circuit, and
a memory unit having stored therein instructions executable by the control circuit to (i) process the at least one sensor output signal to determine at least one value of the at least one operating condition, (ii) compare the at least one determined value of the at least one operating condition to one or more corresponding threshold or range values, (iii) determine a control signal, based on the one or more comparisons, for locking or unlocking of the web retractor, and (iv) provide the control signal to a magnet actuator of the web retractor to cause the web retractor to lock or unlock,
wherein the electrically controlled and magnetically actuated locking web retractor comprises:
a frame including spaced-apart side walls,
a spool rotatably mounted between the side walls, the spool rotatable in a web take-up direction and web a payout direction opposite the web take-up direction,
locking components,
a ferromagnetic component movable relative to the locking components between an unlocking position in which the ferromagnetic component does not cause the locking components to prevent the spool from rotating in the web pay out direction and a locking position in which the ferromagnetic component causes the locking components to prevent the spool from rotating in the web pay out direction,
a magnet responsive to actuation to cause the ferromagnetic component to move from the unlocking position to the locking position, and responsive to de-actuation to cause the ferromagnetic component to move from the locking position to the unlocking position, and
the magnet actuator, the magnet actuator configured to be responsive to the control signal to actuate and de-actuate the magnet.

16. The system of claim 15, wherein the at least one sensor includes at least one vehicle dynamics sensor configured to produce at least one respective vehicle dynamics sensor output signal corresponding to vertical movement of the motor vehicle relative to a reference position of the motor vehicle,
and wherein the memory has stored therein at least one vertical movement threshold or range value,
and wherein the instructions stored in the memory further include instructions executable by the control circuit to produce a control signal for locking the web retractor if the at least one respective vehicle dynamics sensor output signal exceeds the at least one vertical movement threshold or range value.

17. The system of claim 16, wherein the at least one sensor further includes at least one vehicle weight sensor configured to produce a vehicle weight sensor output signal corresponding to a weight of the motor vehicle,
and wherein the memory has stored therein a plurality of vertical movement thresholds or range values each for a different value or range of motor vehicle weights,
and wherein the instructions stored in the memory further include instructions executable by the control circuit to process the vehicle weight sensor output signal to determine a weight of the motor vehicle, and to produce a control signal for locking the web retractor if the at least one respective vehicle dynamics sensor output signal exceeds the vertical movement threshold or range value for the respective value or range of motor vehicle weights matching the determined weight of the motor vehicle.

\* \* \* \* \*